(12) United States Patent　　(10) Patent No.: US 12,260,683 B2
Georgeson et al.　　　　　　　　(45) Date of Patent: Mar. 25, 2025

(54) SMART SYSTEM FOR RAPID AND ACCURATE AIRCRAFT MAINTENANCE DECISION MAKING

(71) Applicant: THE BOEING COMPANY, Chicago, IL (US)

(72) Inventors: Gary E. Georgeson, Tacoma, WA (US); Gregory J. Sweers, Renton, WA (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 17/829,123

(22) Filed: May 31, 2022

(65) Prior Publication Data

US 2022/0406098 A1　　Dec. 22, 2022

Related U.S. Application Data

(60) Provisional application No. 63/211,520, filed on Jun. 16, 2021.

(51) Int. Cl.
  *G07C 5/00*　　(2006.01)
  *G06N 20/00*　　(2019.01)
  *G07C 5/06*　　(2006.01)
  *G07C 5/08*　　(2006.01)

(52) U.S. Cl.
  CPC ............... *G07C 5/006* (2013.01); *G07C 5/06* (2013.01); *G07C 5/0808* (2013.01); *G06N 20/00* (2019.01)

(58) Field of Classification Search
  CPC ............. G05B 2219/24019; G05B 2219/2637; G05B 2219/32226; G05B 23/0283; G06N 20/00; G06N 3/045; G06N 3/0464; G06N 3/09; G07C 5/006; G07C 5/06
  See application file for complete search history.

(56) References Cited

U.S. PATENT DOCUMENTS

2017/0236075 A1 *　8/2017　Shi ........................ G06T 7/0008
  　　　　　　　　　　　　　　　　　　　　701/31.4

* cited by examiner

*Primary Examiner* — Charles J Han
(74) *Attorney, Agent, or Firm* — Yee & Associates, P.C.

(57) ABSTRACT

Certain aspects of the present disclosure provide techniques for a method, including: receiving multi-dimensional event data associated with a vehicle event; determining, based on the multi-dimensional event data, an inspection classification for the vehicle event; receiving multi-dimensional analysis data associated with the inspection classification for the vehicle event; determining, based on the multi-dimensional analysis data, a repair classification for the vehicle event; receiving multi-dimensional action data associated with the repair classification for the vehicle event; and determining, based on the multi-dimensional action data, a monitoring classification for the vehicle event.

20 Claims, 16 Drawing Sheets

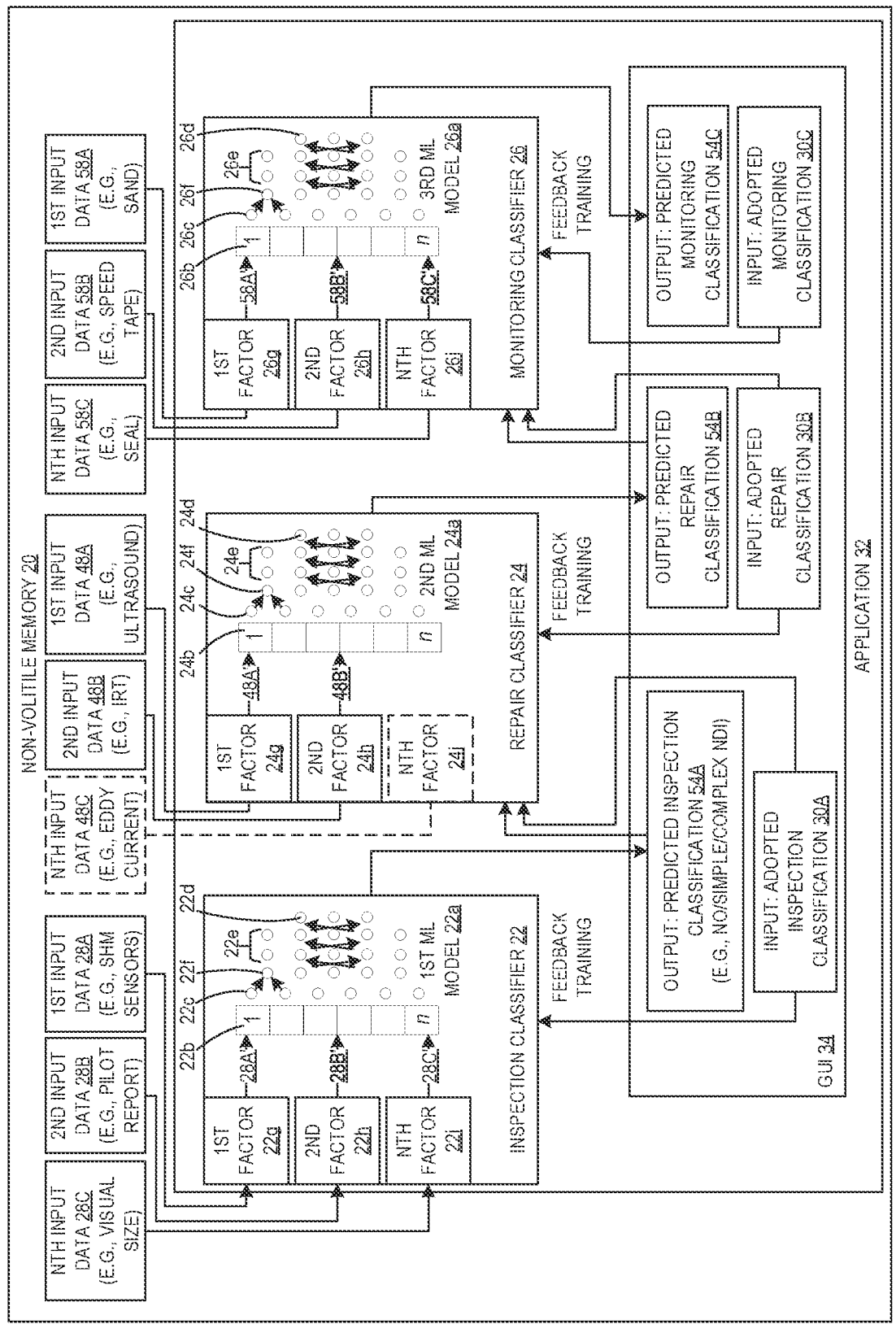
FIG. 2    RUN-TIME PHASE

SMART SYSTEM FOR RAPID AND ACCURATE AIRCRAFT MAINTENANCE DECISION MAKING

CROSS-REFERENCE TO RELATED APPLICATIONS

The present disclosure claims the benefit of and priority to U.S. Provisional Patent Application No. 63/211,520, filed Jun. 16, 2021, which is hereby incorporated by reference in its entirety.

FIELD

This disclosure relates generally to machine learning and machine learning processes and systems, and in particular to determining appropriate classifications for maintenance events, repairs, and repair follow-up. The techniques described herein can be applied to data related to vehicles, for example an aircraft.

BACKGROUND

Aircraft maintenance, including inspection following in-flight events, initial repair, and follow-up inspections and repairs, is important to keep an aircraft flight ready, and is also a significant cost for vehicle operators. Such maintenance often involves non-destructive evaluation of a portion of an aircraft, followed by an initial repair. Use of non-destructive evaluation techniques can be labor intensive and are subject to human judgment regarding the appropriate inspection technique, repairs, and follow-up action schedule to pursue. For example, the appropriate non-destructive techniques are determined on a case-by-case basis per each maintenance event. Thus, deciding the appropriate maintenance to perform, such as determining the appropriate non-destructive evaluation techniques to use, is time-consuming, is often costly, can be based on incomplete information, and can contain errors of judgment.

Accordingly, there is a need for a system for determining maintenance actions required using machine learning that removes the need for time-consuming and costly exploratory investigations and human intuition.

SUMMARY

Certain embodiments provide a method. The method generally includes receiving multi-dimensional event data associated with a vehicle event and determining, based on the multi-dimensional event data, an inspection classification for the vehicle event. The method further includes receiving multi-dimensional analysis data associated with the inspection classification for the vehicle event and determining, based on the multi-dimensional analysis data, a repair classification for the vehicle event. The method further includes receiving multi-dimensional action data associated with the repair classification for the vehicle event and determining, based on the multi-dimensional action data, a monitoring classification for the vehicle event.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

DESCRIPTION OF THE DRAWINGS

The appended figures depict certain aspects of the one or more embodiments and are therefore not to be considered limiting of the scope of this disclosure.

FIG. 2 depicts an inspection classifier, repair classifier, and monitoring classifier of the maintenance system according to FIG. 1.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
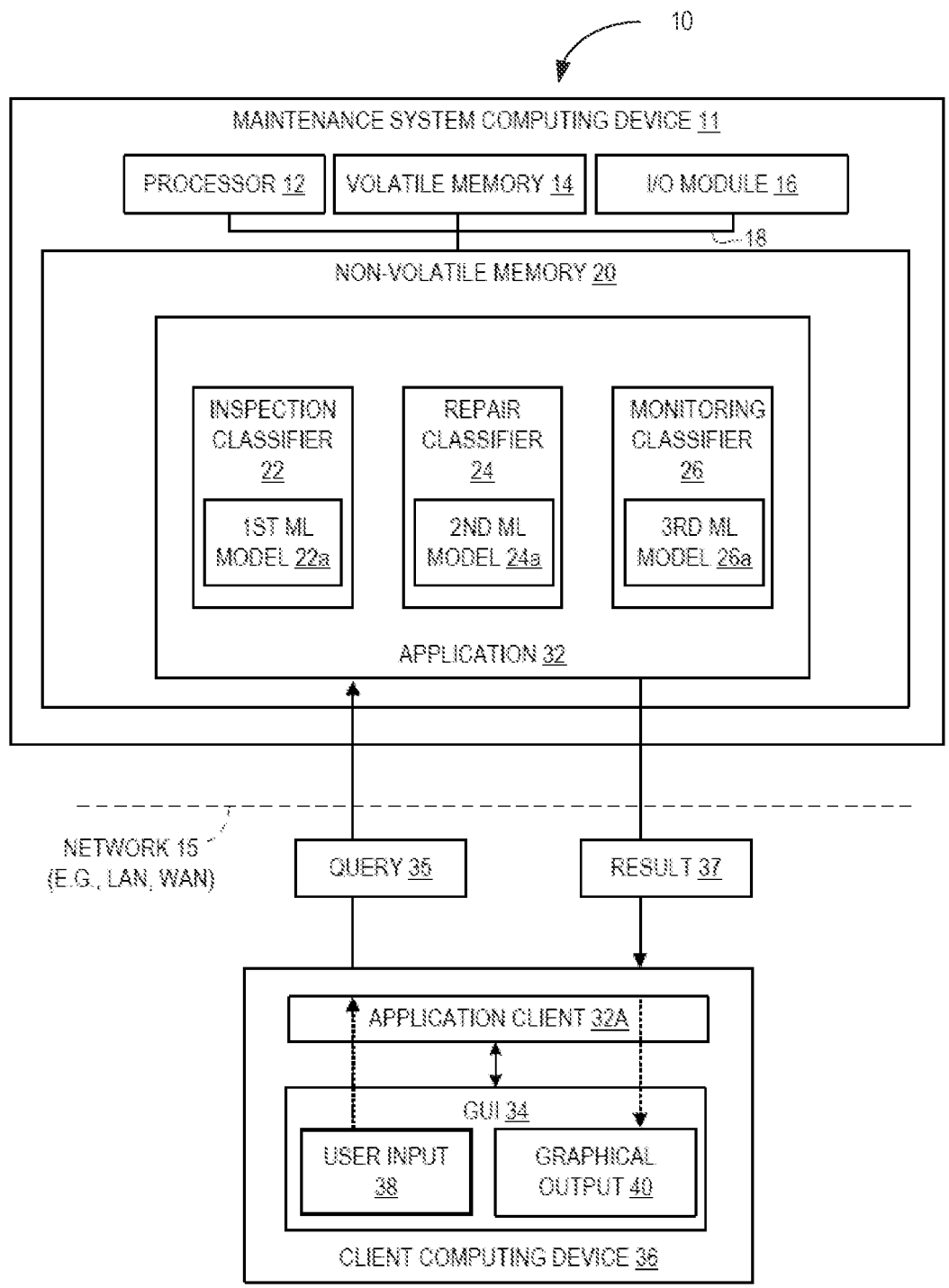
FIG. 1 depicts a maintenance system according to an example embodiment of the subject disclosure.

In view of the above, both a challenge and opportunity exists to improve the accuracy, reliability, and efficiency of inspection and repair diagnoses by applying artificial intelligence, such as machine learning, to maintenance processes. Accordingly, a maintenance system is provided in which inspection, repair, and monitoring predictions can be made based on run-time input using separate machine learning models, each of which can be subject to feedback training based on inputs for improved performance over time.

The maintenance system receives a request or query from a user regarding an event, which may also be referred to as a vehicle event. The vehicle event is an event that requires a maintenance action or decision. As part of the request, the maintenance system receives multi-dimensional event data associated with the vehicle event. Generally, any particular aspect of an event associated with a vehicle may be considered a dimension of data about that event, and any number of different aspects, and therefore dimensions, of event data may be considered. As an example, the multi-dimensional event data may include the time and date of the event; characteristics of the vehicle to which the event pertains; camera images, video, and audio data associated with the event; data associated with visual or inspections of the vehicle related to the event; pilot reports regarding the event; and data from structural health monitoring (SHM) sensors instrumented on the vehicle, to name just a few examples. Visual inspections may include information gathered from inspections of the vehicle including measurements taken or conclusions drawn from inspections, such as using a light at different angles to determine whether a dent is present. The structural health monitoring sensors may include inertial accelerometers, inertial gyroscopes, strain gauges, displacement transducers, air speed sensors, temperature sensors, and the like. The multi-dimensional event data may further include additional data associated with the event or the vehicle including dimensions, location, environmental information including temperature or humidity, material information, historical data including information on past events, or vehicle data.

A learnable event model, such as an inspection classifier, receives the multi-dimensional event data and uses a first machine learning model to determine an inspection classification for the vehicle event. The inspection classification categorizes a type of inspection needed, which may be referred to as a vehicle inspection, such as none or a simple or complex non-destructive inspection. The inspection classifier uses learnable event factors to adjust the influence of the multi-dimensional event data on the inspection classification. The learnable event factors may be updated based on feedback data from the inspection classification, which beneficially incorporates information learned from previous inspection classifier determinations.

The request received by the maintenance system further includes multi-dimensional analysis data associated with the inspection classification. Generally, any particular aspect of an analysis associated with the vehicle may be considered a dimension of data about that analysis, and any number of different aspects, and therefore dimensions, of analysis data may be considered. As an example, the multi-dimensional analysis data may include data associated with an analysis of the event or the vehicle; the time and date of the analysis; camera images, video and audio data associated with the analysis; data generated by simulations including thermal, fluid, and structural analyses; data resulting from material testing analyses including tensile, fatigue, and hardness data; data resulting from microscopy analyses including data from scanning electron microscopes (SEMs); reports associated with the analysis; and findings associated with non-destructive inspections of the vehicle including infrared thermography (IRT), ultrasonic, and eddy current inspections, to name just a few examples. Findings associated with non-destructive inspections may include characteristics of the inspection equipment, environmental information associated with the inspection including temperature and humidity, information gathered from inspections of the vehicle including measurements taken or conclusions drawn from inspections, such as using an eddy current probe to determine if a crack is present. The multi-dimensional analysis data may be associated with the inspection classification for the vehicle event. The multi-dimensional analysis data may further include data on effectiveness, cost, speed, or other information associated with the non-destructive inspections. The multi-dimensional analysis data and the inspection classification are received as an input to an analysis model, such as a repair classifier, which uses a second machine learning model to determine a repair classification for the vehicle event. The repair classification categorizes a type of action, which may also be referred to as a vehicle action, or repair needed such as none or a simple or complex repair. The repair classifier uses learnable analysis factors, which may be updated, to adjust the influence of the multi-dimensional analysis data on the repair classification.

The request received by the maintenance system further includes multi-dimensional action data associated with the repair classification. Generally, any particular aspect of an action associated with the vehicle may be considered a dimension of data about that action, and any number of different aspects, and therefore dimensions, of action data may be considered. As an example, the multi-dimensional action data may include data associated with a repair action of the vehicle resulting from the event; the time and date of the action; camera images, video and audio data associated with the action; data resulting from analyses or tests associated with the action; and data associated with repairs including sanding, sealing, or taping with speed tape, to name just a few examples. The multi-dimensional action data may be associated with the repair classification for the vehicle event. The multi-dimensional action data may further include data on repair parameters, location, durability, or other information associated with the repairs. The multi-dimensional action data and the repair classification are received as an input to an action model, such as a monitoring classifier, which uses a third machine learning model to determine a monitoring classification for the vehicle event. The monitoring classifier categorizes a type of information or monitoring needed after the repair, such as a set lifecycle for the repair, a schedule for inspections, or a follow-up repair action. The monitoring classifier uses learnable monitoring factors, which may be updated, to adjust the influence of the multi-dimensional action data on the monitoring classification.

Examples of Systems for Use in Maintenance of Vehicles

Referring to FIG. 1, a maintenance system 10 is provided (e.g., aircraft, watercraft, spacecraft, automobiles, etc.).

Maintenance may be required after an event, such as a hail storm or a fire impacting the vehicle. The system 10 comprises a maintenance computing device 11 comprising a processor 12, an input/output (I/O) module 16, volatile memory 14, and non-volatile memory 20 storing an application 32 and three classifiers: an inspection classifier 22, a repair classifier 24, and a monitoring classifier 26 which comprise a first machine learning (ML) model 22a, a second machine learning model 24a, and a third machine learning model 26a, respectively. Each classifier further comprises a multi-dimensional space such as an event multi-dimensional space as discussed in relation to FIG. 5, an inspection multi-dimensional space, and a repair multi-dimensional space. A bus 18 can operatively couple the processor 12, the input/output module 16, and the volatile memory 14 to the non-volatile memory 20. Although the application 32 and the classifiers 22, 24, 26 are depicted as hosted at one computing device 11, it will be appreciated that the application 32 and the classifiers 22, 24, 26 can alternatively be hosted across a plurality of computing devices to which the computing device 11 is communicatively coupled via a network 15, including a client computing device 36 operatively coupled to the maintenance computing device 11. In some examples, the network 15 can take the form of a local area network (LAN), wide area network (WAN), wired network, wireless network, personal area network, or a combination thereof, and can include the Internet.

The system 10 comprises a processor 12 configured to store the application 32 and classifiers 22, 24, 26 in non-volatile memory 20 that retains instructions stored data even in the absence of externally applied power, such as FLASH memory, a hard disk, read only memory (ROM), electrically erasable programmable memory (EEPROM), etc. The instructions include one or more programs, including application 32, and data used by such programs sufficient to perform the operations described herein. In response to execution by the processor 12, the instructions cause the processor 12 to apply a learnable event model, for example, by executing the inspection classifier 22 including at least the first machine learning model 22a, apply a learnable analysis model, for example, by executing the repair classifier 24 including at least the second machine learning model 24a, and/or apply a learnable action model, for example, by executing the monitoring classifier 26 including at least the third machine learning model 26a.

The processor 12 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 14 such as random access memory (RAM), static random access memory (SRAM), dynamic random access memory (DRAM), etc., which temporarily stores data only for so long as power is applied during execution of programs.

In one example, a user operating a client computing device 36 can send a maintenance-related query 35 to the maintenance computing device 11. The query 35 may be initiated after an event has occurred, such as an aircraft experiencing a lightning strike, a hail storm, a hard impact, overheating, an environmental issue such as corrosion or mold, an animal strike, a foreign object intrusion, or a beyond design limit event. As described further with reference to FIG. 2, the maintenance-related query 35 can include multi-dimensional data 28 such as event input data 28A-C pertaining to an inspection for the inspection classifier 22, multi-dimensional analysis data 48 such as inspection input data 48A-C pertaining to a repair for the repair classifier 24, or multi-dimensional action data 58 such as repair input data 58A-C pertaining to a repair monitoring action for the monitoring classifier 26. The processor 12 of the maintenance computing device 11 is configured to receive the maintenance-related query 35 from the user and execute one of the classifiers 22, 24, 26 of the application 32 to determine the most appropriate inspection classification via the inspection classifier 22, determine the most appropriate repair classification via the repair classifier 24, and/or determine the most appropriate monitoring classification via the monitoring classifier 26. Thus, as discussed below, based on the repair classification indicated by the repair input data 58A-58C, the monitoring classification produced by the monitoring classifier 26 may indicate information about the repair or follow-up inspections and repairs. For example, a predicted lifecycle of the repair, a monitoring schedule for the repair, and/or a monitoring repair action, which is a follow up repair to be made during the monitoring period to the initial repair for which repair input data was collected. The processor 12 then returns a response (e.g., query results 37) to the maintenance-related query 35 based on the determination that was made by the classifiers 22, 24, 26 of the application 32, the response containing outputs that are the result of the determination that was made by the classifiers 22, 24, 26.

The client computing device 36 can execute an application client 32A to send a query 35 to the maintenance computing device 11 upon detecting a user input 38, and subsequently receive the query results 37 from the maintenance computing device 11. The application client 32A can be coupled to a graphical user interface 34 of the client computing device 36 to display a graphical output 40 of the received query results 37.

As later discussed in relation to FIG. 4B, the inspection classifications may include a type of inspection or type of vehicle inspection to perform on a vehicle from the event such as a non-destructive inspection. The repair classification may include a type of vehicle action to perform on a vehicle associated with the vehicle event such as a maintenance or repair action or a repair. The monitoring classification may include a type of information about a maintenance action or a repair action to perform on a vehicle associated with the vehicle event.

Referring to FIG. 2, a view of the inspection classifier 22, repair classifier 24, and monitoring classifier 26 are depicted. As shown, the maintenance system 10 includes a computer system comprising a processor 12 and a non-volatile memory 20 storing executable instructions that, in response to execution by the processor 12, cause the processor 12 to execute an inspection classifier 22 including at least a first machine learning model 22a. The inspection classifier 22 is configured to receive event input data including multi-dimensional event data 28 (e.g., event input data 28A-C) from a plurality of data sources associated with a vehicle (e.g., an aircraft), the data sources including visual inspections, pilot reports, and/or structural health monitoring (SHM) sensors instrumented on the vehicle. The visual inspections can include information gathered from inspections of the vehicle such as measurements taken or conclusions drawn from inspections such as using a light at different angles to determine whether a dent is present. The structural health monitoring sensors may include inertial accelerometers, inertial gyroscopes, strain gauges, displacement transducers, air speed sensors, temperature sensors, and the like. The multi-dimensional event data 28 may include at least one of dimensions, location, time, environmental information such as temperature or humidity, material information, historical data such as information on past events, or vehicle data associated with the event. Although three sets of event input data 28A-C are shown in FIG. 2, it will be appreciated that the number of sets of event input data is not particularly limited, and may alternatively number four or more sets of input data, for example.

The inspection classifier 22 applies the learnable event factors 22g-i to the event input data 28A-C, respectively. The learnable event factors 22g-i are used to adjust the influence of each event input data 28A-C based on relevancy of the event input data 28A-C to an output (e.g., a predicted inspection classification 54A) of the inspection classifier 22. For example, if the first input data 28A includes SHM sensors that are not close to a location of an event being analyzed, the first input data 28A is adjusted by a first factor 22g to have less influence on the output. After the learnable event factors 22g-i are applied, the event input data 28A-C becomes adjusted event input data 28A'-C'. In some embodiments, the learnable event factors 22g-i are weights that are applied to the event input data 28A-C.

The inspection classifier 22 extracts features 22f of the adjusted event input data 28A'-C', which can include at least one of camera images, audio data, or dimensional measurements, determines a predicted inspection classification 54A based upon the extracted features 22f, and outputs the predicted inspection classification 54A. The predicted inspection classification 54A is one of a plurality of candidate inspection classifications. The processor 12 receives user input 38 of an adopted inspection classification 30A for the event input data 28A-C, and performs feedback training of the first machine learning model 22a using the event input data 28A-C and the adopted inspection classification 30A as a feedback training data pair. The adopted inspection classification 30A may be inputted through a graphical user interface as later described in relation to FIG. 6. The first machine learning model 22a can include, in one example, an input layer 22b connected to one or more convolutional layers 22c and an output layer 22d including a plurality of nodes 22e each indicating a value for an extracted feature vector of an extracted feature 22f.

Figure 3A:
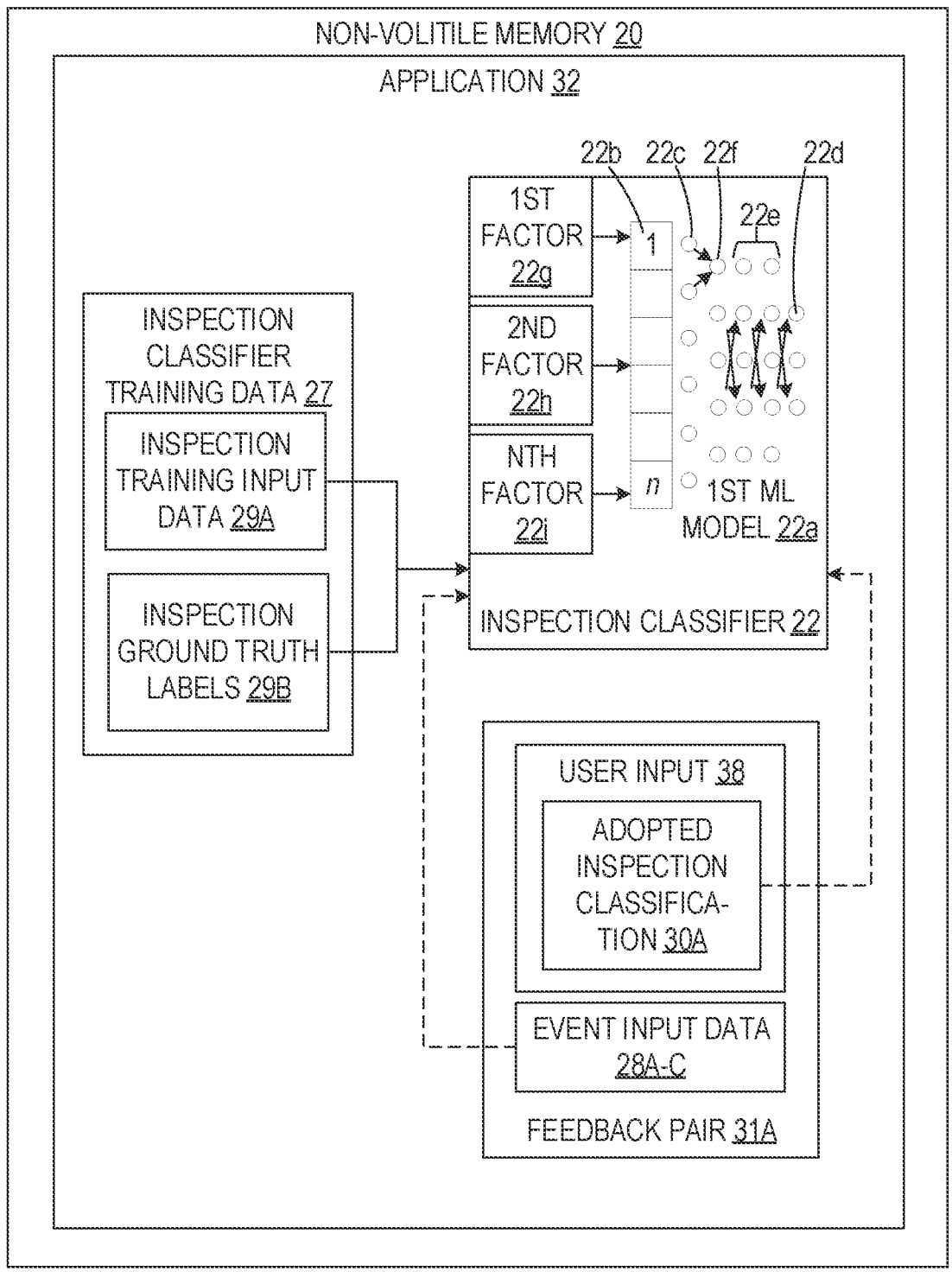
FIG. 3A depicts a training phase of the inspection classifier according to FIG. 1, including an initial training phase and a feedback training phase.

Referring to FIG. 3A, the inspection classifier 22 may be trained on inspection classifier training data 27, including inspection training input data 29A and associated inspection ground truth labels 29B. The inspection classifier training data 27 can further include, for example, camera images, audio data, or dimensional measurements. The inspection training input data 29A includes information similar to that of the multi-dimensional event data 28, such as structural health data from structural health monitoring sensors instrumented on the vehicle. The processor 12 is configured to pair the inspection ground truth labels 29B with the inspection training input data 29A, and perform training of the first machine learning model 22a using pairs of inspection ground truth labels 29B and inspection training input data 29A in the inspection classifier training data 27. Ground truth labels, including inspection ground truth labels 29B, are discussed in relation to FIG. 4B.

Figure 4A:
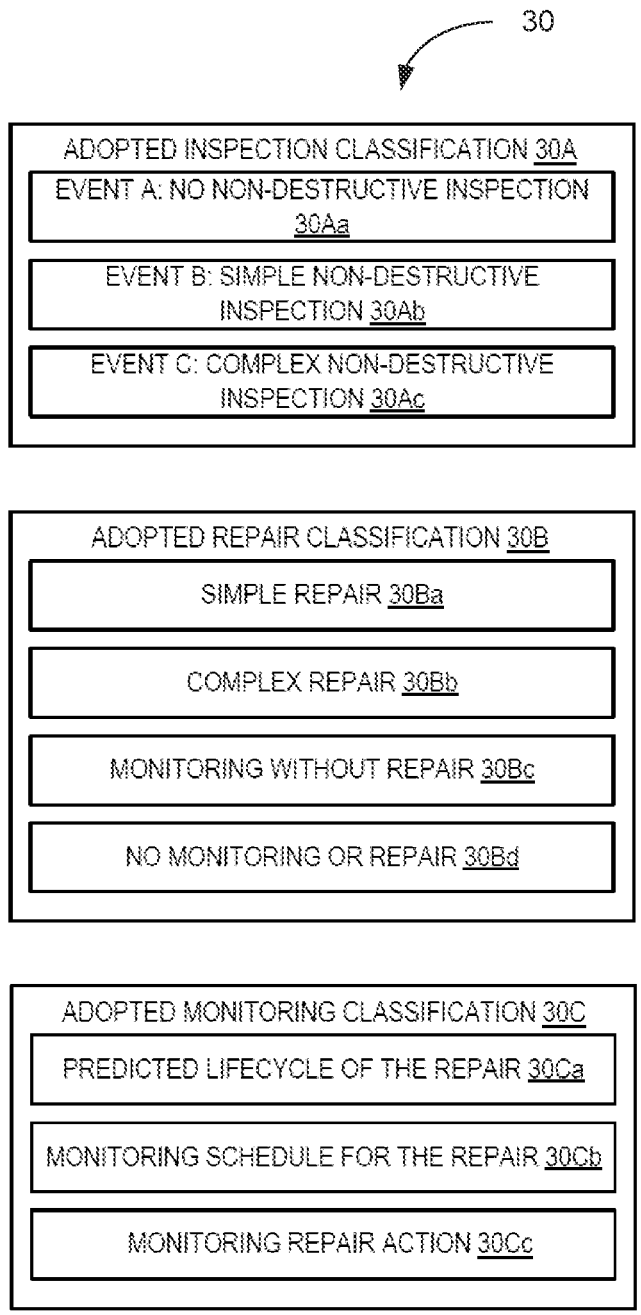
FIG. 4A depicts the possible inspection classifications, repair classifications, and monitoring classifications that can be outputted by the inspection classifier, the repair classifier, and the monitoring classifier, respectively, according to an example of the subject disclosure.

Likewise, the processor 12 is configured to receive user input 38 including the adopted inspection classification 30A for the event input data 28A-C, pair the adopted inspection classification 30A with the event input data 28A-C to create an inspection training data feedback pair 31A, and perform feedback training of the inspection classifier 22 using the inspection training data feedback pair 31A. User input 38 may further include dimensions, location, and other information collected for the event as part of the inspection training data feedback pair 31A. The feedback training of inspection classifier 22 includes adjusting the learnable event factors 22g-i based on the inspection training data feedback pair 31A. In this way, outputs of the inspection classifier 22 from previous analyses may be taken into account when determining present learnable event factors 22g-i. The feedback training of the inspection classifier 22 also includes adjusting the first machine learning model 22a based on the inspection training data feedback pair 31A as discussed later in relation to FIG. 5. As shown in FIG. 4A, the adopted inspection classification 30A can be selected from a plurality of candidate inspection classifications 30Aa-h, which can include A-Event: recommending no non-destructive inspection 30Aa, B-Event: recommending a simple non-destructive inspection 30Ab, and C-Event: recommending a complex non-destructive inspection 30Ac, for example. As later discussed in relation to FIG. 4B, the adopted inspection classification 30A may include a type of inspection or vehicle inspection to perform on a vehicle from the event. Although shown for the adopted inspection classification 30A, the plurality of candidate inspection classifications 30Aa-h may also be used as the predicted inspection classifications 54A.

In certain embodiments (not shown), the inspection classifier 22 determines a predicted event based on the event input data 28A-C and uses the predicted event to determine the predicted inspection classification 54a. For example, the predicted event is used to adjust the learnable event factors 22g-i. The predicted event may also be used by the first machine learning model 22a to determine a type of inspection. The inspection classifier 22 may output the predicted event, for example, to a user and receive an adopted event from the user before determining the predicted inspection classification 54a. The adopted event may be inputted through a graphical user interface in the same manner as previously described in relation to the adopted inspection classification 30A. The adopted event may be used to determine the predicted inspection classification 54a. The adopted event may be used with the event input data 28A-C to form a feedback pair and perform feedback training of the inspection classifier 22 in a manner similar to as described with respect to the inspection training data feedback pair 31A in FIG. 3A.

Referring back to FIG. 2, the processor is further configured to execute a repair classifier 24 including at least a second machine learning model 24a. The repair classifier 24 is configured to receive inspection input data including multi-dimensional analysis data 48 (e.g., inspection input data 48A-C) and the adopted inspection classification 30A. In certain embodiments, the adopted inspection classification 30A is included in at least one dimension of the multi-dimensional analysis data 48 and the learnable analysis factors include a factor corresponding to the adopted inspection classification 30A (not shown). The repair classifier 24 applies the learnable analysis factors 24g-i to the inspection input data 48A-C, respectively. The learnable analysis factors 24g-i are used to adjust the influence of each inspection input data 48A-C based on relevancy of the inspection input data 48A-C to an output (e.g., a predicted repair classification 54B) of repair classifier 24. For example, if the first input data 48A includes ultrasound findings that have been found to be effective in determining previous repair classifications (e.g., the adopted inspection classification 30A), the first input data 48A is adjusted by a first factor 24g to have more influence on the output. After the learnable analysis factors 24g-i are applied, the inspection input data 48A-C becomes adjusted inspection input data 48A'-C'. In some embodiments, the learnable event factors 24g-i are weights that are applied to the inspection input data 48A-C.

The repair classifier 24 is configured to extract features of the adjusted inspection input data 48A'-C', determine a predicted repair classification 54B based upon the extracted features 24f, and output a predicted repair classification 54B. Although three sets of inspection input data 48A-C are shown in FIG. 2, it will be appreciated that the number of sets of inspection input data is not particularly limited, and may alternatively number four or more sets of input data, for example. The predicted repair classification 54B is one of a plurality of candidate repair classifications. The processor 12 receives user input 38 of an adopted repair classification 30B for the inspection input data 48A-C, and performs feedback training of the second machine learning model 24a using the inspection input data 48A-C and the adopted repair classification 30B as a feedback training data pair. The adopted repair classification 30B may be inputted through the graphical user interface previously described in relation to FIG. 2. The second machine learning model 24a can include an input layer 24b connected to one or more convolutional layers 24c and an output layer 24d including a plurality of nodes 24e each indicating a value for an extracted feature vector of an extracted feature 24f.

Figure 3B:
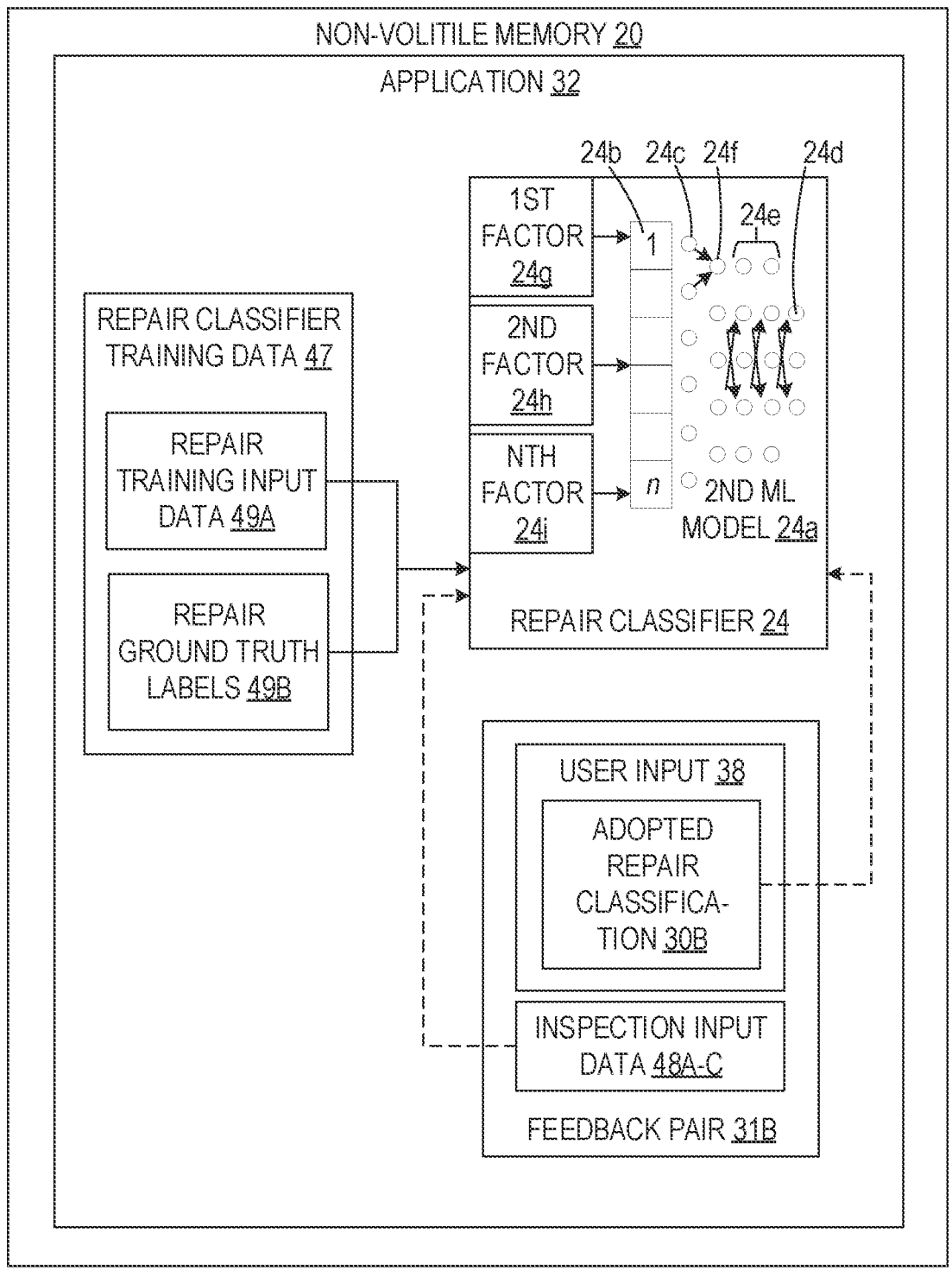
FIG. 3B depicts a training phase of the repair classifier according to FIG. 1, including an initial training phase and a feedback training phase.

Referring to FIG. 3B, the repair classifier 24 may be trained on repair classifier training data 47 including repair training input data 49A and associated repair ground truth labels 49B. The repair classifier training data 47 includes imaging studies and electrical measurements. The repair training input data 49A includes information similar to that of the multi-dimensional analysis data 48. The processor 12 is configured to pair the repair ground truth labels 49B with the repair training input data 49A, and perform training of the second machine learning model 24a using pairs of ground truth labels 49B and repair training input data 49A in the repair classifier training data 47.

Likewise, the processor 12 is configured to receive user input 38 including the adopted repair classification 30B for the inspection input data 48A-C, pair the adopted repair classification 30B with the inspection input data 48A-C to create a repair training data feedback pair 31B, and perform feedback training of the repair classifier 24 using the repair training data feedback pair 31B. User input 38 may further include effectiveness, cost, speed, and other information about the adopted repair classification 30B as part of the repair training data feedback pair 31B. The feedback training of repair classifier 24 includes adjusting the learnable analysis factors 24g-i based on the repair training data feedback pair 31B. In this way, outputs of the repair classifier 24 from previous analyses are taken into account when determining present learnable analysis factors 24g-i. The feedback training of the repair classifier 24 also includes adjusting the second machine learning model 24a based on the repair training data feedback pair 31B, similar to what is discussed later in relation to FIG. 5.

For example, in certain embodiments the adopted repair classification 30B in FIG. 2 is a complex non-destructive inspection. This repair classification 30B may typically require all of inspection input data 48A-C for an event under analysis, but previous experience from similar events provides that an Nth input data 48C (e.g., eddy current findings) and the corresponding Nth factor 24i are not useful for determining the predicted repair classification 54B. Thus, only inspection input data 48A and 48B and the corresponding factors 24g and 24h are used to determine the predicted repair classification 54B. As shown in FIG. 4A, the adopted repair classifications 30B can be selected from a plurality of candidate repair classifications 30Ba-p. The candidate repair classifications 30Ba-p can include simple repair 30Ba, complex repair 30Bb, monitoring without repair 30Bc, and no monitoring or repair 30Bd. Although shown for the adopted repair classifications 30B, the plurality of candidate repair classifications 30Ba-p may also be used as the predicted repair classifications 54B.

Referring back to FIG. 2, the processor 12 further executes a monitoring classifier 26 including at least a third machine learning model 26a. The monitoring classifier 26 is configured to receive repair input data including multi-dimensional action data 58 (e.g., repair input data 58A-C) and the adopted repair classification 30B. In certain embodiments, the adopted repair classification 30B is included in at least one dimension of the multi-dimensional action data 58 and the learnable action factors include a factor corresponding to the adopted repair classification 30B (not shown). The monitoring classifier 26 applies the learnable action factors 26g-i to the repair input data 58A-C, respectively. The learnable action factors 26g-i are used to adjust the influence of each repair input data 58A-C based on relevancy of the repair input data 58A-C to an output (e.g., a predicted monitoring classification 54C) of monitoring classifier 26. For example, if the first input data 58A includes sanding data that is somewhat useful for a location of the repairs, the first input data 58A is adjusted by a first factor 26g to have moderate influence on the output. After the learnable action factors 26g-i are applied, the repair input data 58A-C becomes adjusted repair input data 58A'-C'. In some embodiments, the learnable action factors 26g-i are weights that are applied to the repair input data 58A-C.

The monitoring classifier 26 is configured to extract features 26f of the adjusted repair input data 58A'-C', determine a predicted monitoring classification 54C based upon the extracted features 26f, and output the predicted monitoring classification 54C. Although three sets of repair input data 58A-C are shown in FIG. 2, it will be appreciated that the number of sets of repair input data is not particularly limited, and may alternatively number four or more sets of input data, for example. The predicted monitoring classification 54C is one of a plurality of candidate monitoring classifications. The processor 12 receives user input 38 of an adopted monitoring classification 30C for the repair input data 58A-C, and performs feedback training of the third machine learning model 26a using the repair input data 58A-C and the adopted monitoring classification 30C as a feedback training data pair. The adopted monitoring classification 30C may be inputted through the graphical user interface previously described in relation to FIG. 2. The third machine learning model 26a can include an input layer 26b connected to one or more convolutional layers 26c and an output layer 26d including a plurality of nodes 26e each indicating a value for an extracted feature vector of an extracted feature 26f.

Figure 3C:
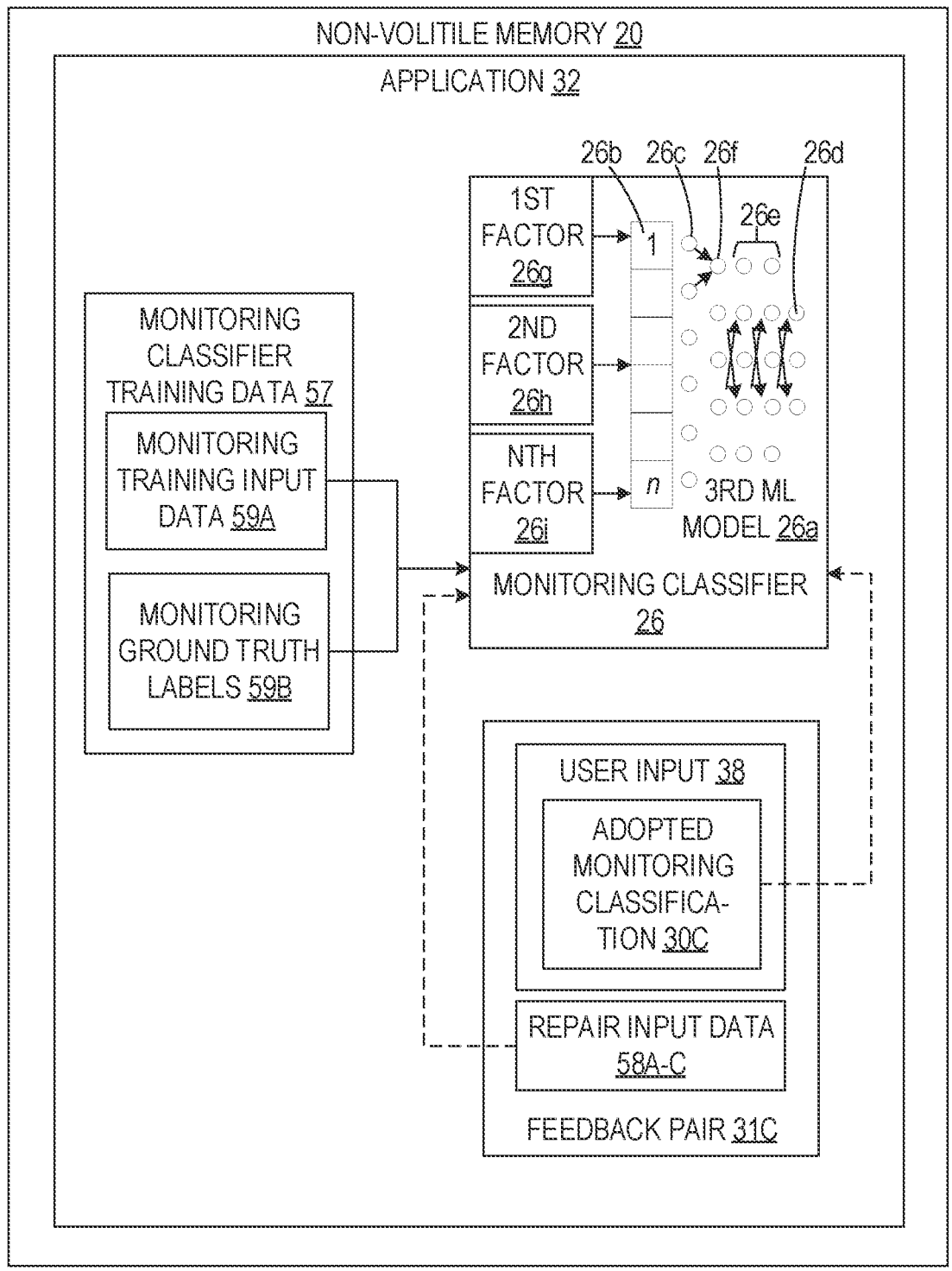
FIG. 3C depicts a training phase of the monitoring classifier according to FIG. 1, including an initial training phase and a feedback training phase.

Referring to FIG. 3C, the monitoring classifier 26 may be trained on monitoring classifier training data 57 including monitoring training input data 59A and associated monitoring ground truth labels 59B. The monitoring training input data 59A includes information similar to that of the multi-dimensional action data 58, such as repair materials or type of repair. The processor 12 is configured to pair the monitoring ground truth labels 59B with the monitoring training input data 59A, and perform training of the third machine learning model 26a using pairs of monitoring ground truth labels 59B and monitoring training input data 59A in the monitoring classifier training data 57.

Likewise, the processor 12 is configured to receive user input 38 including the adopted monitoring classification 30C for the repair input data 58A-C, pair the adopted monitoring classification 30C with the repair input data 58A-C to create a monitoring training data feedback pair 31C, and perform feedback training of the monitoring classifier 26 using the monitoring training data feedback pair 31C. User input 38 may further include the parameters, location, durability, and other information about the adopted monitoring classification 30C as part of the monitoring training data feedback pair 31C. The feedback training of monitoring classifier 26 includes adjusting the learnable action factors 26*g-i* based on the monitoring training data feedback pair 31C. In this way, outputs of the monitoring classifier 26 from previous analyses are taken into account when determining present learnable action factors 26*g-i*. The feedback training of the monitoring classifier 26 also includes adjusting the third machine learning model 26*a* based on the monitoring training data feedback pair 31C similar to what is discussed later in relation to FIG. 5. As shown in FIG. 4A, the adopted monitoring classifications 30C can be selected from a plurality of candidate monitoring classifications 30Ca-c. The candidate monitoring classifications 30Ca-c can include a predicted lifecycle of the repair 30Ca, a monitoring schedule for the repair 30Cb, and a monitoring repair action 30Cc. Although shown for the adopted monitoring classifications 30C, the plurality of candidate monitoring classifications 30Ca-c may also be used as the predicted monitoring classifications 54C.

In some embodiments, the learnable event factors 22*g-i*, learnable analysis factors 24*g-i*, and learnable action factors 26*g-i* are weights that are applied to the event input data 28A-C, the inspection input data 48A-C, and repair input data 58A-C, respectively.

Figure 4B:
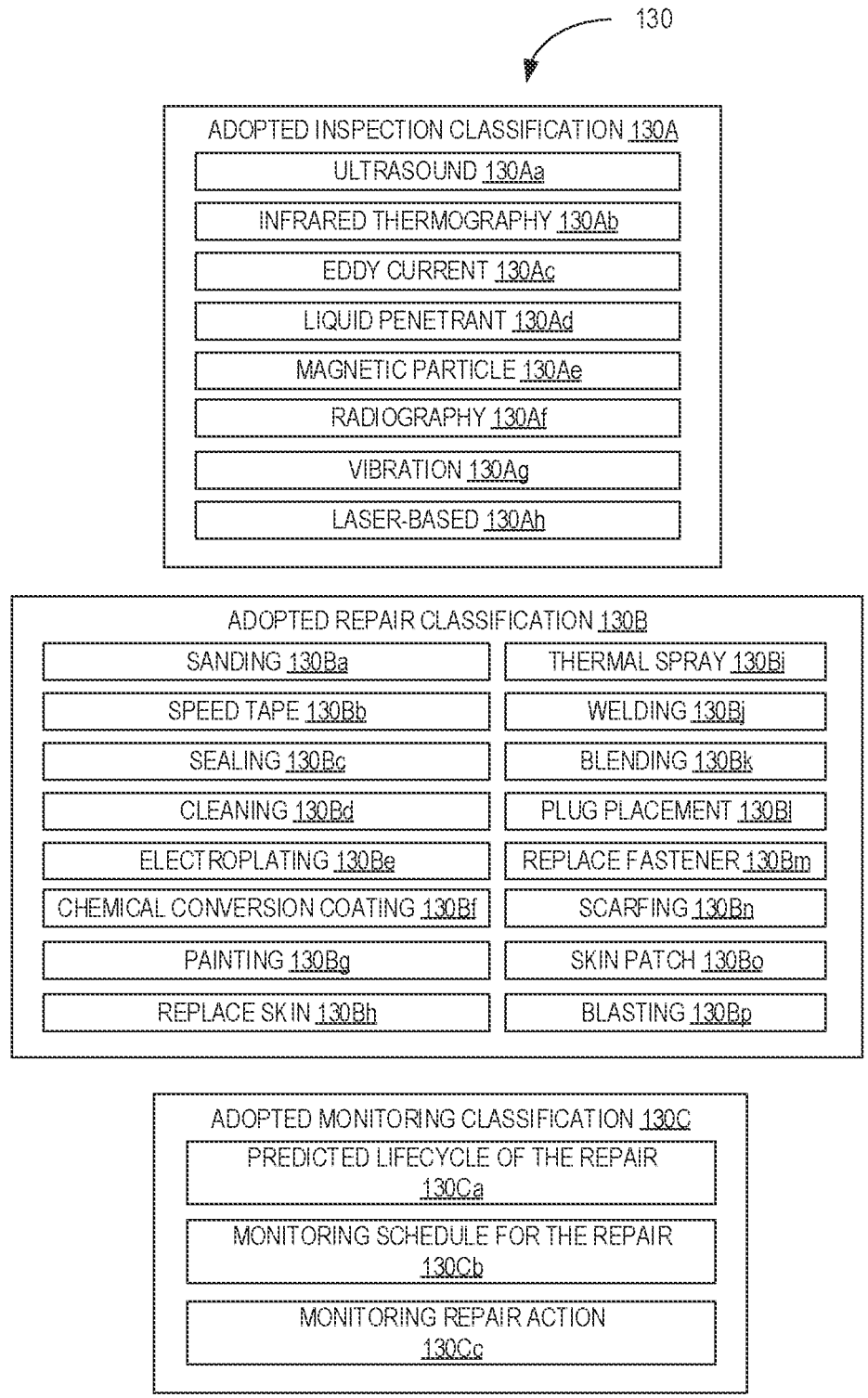
FIG. 4B depicts the possible inspection classifications, repair classifications, and monitoring classifications that can be outputted by the inspection classifier, the repair classifier, and the monitoring classifier, respectively, according to another example of the subject disclosure.

Referring to FIG. 4B, examples 130 of ground truth labels (e.g., the ground truth labels 29B, 49B, and 59B in FIGS. 3A-3C) associated with training input data are illustrated. The example ground truth labels may also be used as selection options for the adopted classifications 30A-C and/or the predicted classifications 54A-C. The adopted inspection classifications 130A can be selected from different types of inspections including, for example, infrared thermography 130Aa, ultrasonic 130Ab, eddy current 130Ac, liquid penetrant 130Ad, magnetic particle 130Ae, radiography 130Af, vibration 130Ag, or laser-based 130Ah. The adopted repair classifications 130B can be selected from different types of actions such as, for example, sanding 130Ba, speed tape 130Bb, sealing 130Bc, cleaning 130Bd, electroplating 130Be, chemical conversion coating 130Bf, painting 130Bg, replace skin 130Bh, thermal spray 130Bi, welding 130Bj, blending 130Bk, plug placement 130Bl, replace fastener 130Bm, scarfing 130Bn, skin patch 130Bo, and blasting 130Bp, such as plastic media blast, glass bead blast, and sand blast. The adopted predicted monitoring classifications 130C can include, for example, a type of information or an action to perform including a predicted lifecycle of the repair 130Ca, a monitoring schedule for the repair 130Cb, and a monitoring repair action 130Cc.

For example, for an event of lightning strike damage leaving molten metal above the skin surface, a user can input a repair classification of blending 130Bk to use a sanding technique that removes the metal, leaving a slight indentation where the metal has been sanded away. For damage in field areas where no structure is behind the skin, a user can input a repair classification of plug placement 130Bl to use a freeze plug where the hole is inspected and prepared, followed by installation of a skin "plug" that is frozen to contract in size and then friction fit into the hole by the warmer operation temperature. For fastener damage, a user can input a repair classification of replacing fastener 130Bm to remove the fastener, inspect the hole for possible cracking, oversizing the hole, and installing the replacement fastener. In some complex damage cases, a user can input a repair classification of replacing skin 130Bh when skin patches are not appropriate. For lesser skin area damage such as minor, a user can input a repair classification of sanding 130Ba if it is possible that sanding can remove minor damage provided a certain skin thickness is maintained, surface smoothness is within prescribed bounds, and resulting surface unevenness are within allowable range, especially in the area of the pitot probes and angle of attach sensors. For lightning strike burns on composite surfaces, a user can input a repair classification of scarfing 130Bn to remove damage in a circular fashion making sure that the number of composite layers (plies) are counted as the scarfing removes all of the damage. The number of layers affected by the scarf can be used to determine the type of repair needed. For field area skins, in cases where the damage is hard to repair with simple treatment, a user can input a repair classification of skin patch 130Bo to remove damage such as tears or large holes by material cutout with a patch put in its place.

Example Multi-Dimensional Space Used in Classifiers

Figure 5:
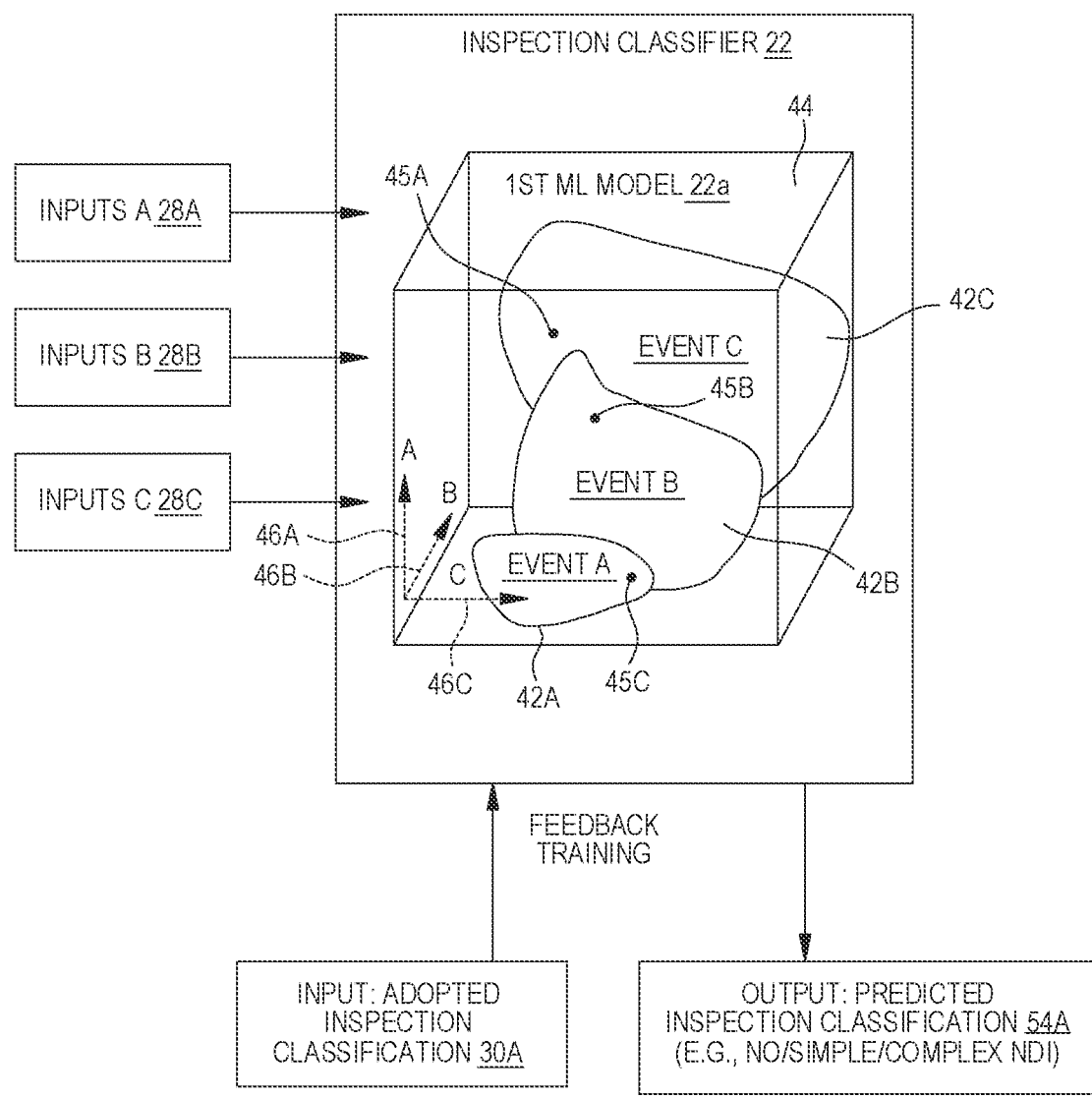
FIG. 5 depicts a multi-dimensional feature space of the inspection classifier according to FIG. 1.

Referring to FIG. 5, a detailed view of the inspection classifier 22 is illustrated with an event multi-dimensional space 44. It will be appreciated that the repair classifier 24 and the monitoring classifier 26 can be similarly configured with multi-dimensional spaces that are adapted to their respective inputs. Multi-modal information from multiple sensors are organized into a multi-dimensional space 44 containing a sum of adjusted event input data 28A'-C' to define the categorization of events. A data point 45A is created in the multi-dimensional space 44 based on a first dimension 46A corresponding to the adjusted first input data 28A', a second dimension 46B corresponding to the adjusted second input data 28B', and the third dimension 46C corresponding to the adjusted third input data 28C'. Over time, a plurality of data points 45A, 45B, and 45C are created in this multi-dimensional space 44, through training or user input, so that the multi-dimensional space 44 correlates to a result output: a predicted inspection classification 54A.

In this example, events are categorized into one of three categories: A-Event 42A (minor impact event, corresponding to "no non-destructive inspection"), B-Event 42B (moderate impact event, corresponding to "simple non-destructive inspection"), and C-Event 42C (major impact event, "complex non-destructive inspection"). An algorithm is used within the multi-dimensional space 44 as a guide for the next action by summing and factoring the inputs 42A-C appropriately and adjusting the learnable event factors 22*g-i* based on the event input data 28A-C and the adopted inspection classification 30A. Over time, the accuracy of the predicted inspection classification 54A outputted by the multi-dimensional space 44 increases by continuously adjusting the learnable event factors 22*g-i* to the event input data 28A-C and adopted inspection classification 30A that continue to be made as inputs to the first machine learning model 22*a*. As more data points (e.g., the plurality of data points 45A, 45B, and 45C) are added with the corresponding adopted inspection classification 30A, the shape of categories 42 change beneficially improving the accuracy of the predicted inspection classification 54A. Data points may also be added using inspection classifier training data as discussed in FIG. 3A. If the sum of adjusted event input data is outside of the categories 42, then the inspection classifier 22 requests input from a user regarding which category 42 to use through a client computing device as discussed in relation to FIG. 1. In certain embodiments, the inspection classifier 22 calculates the nearest of the categories 42 and selects the nearest category, where the nearest category may be determined, for example, by a boundary or centroid of the categories 42.

Accordingly, in aviation applications, relative inputs from a diverse sensors set on and off an aircraft to be compared, and predicted steps for the repair or monitoring of aircraft can be communicated for continued aircraft operation. Using machine learning within a networked design, a course of action can be concluded using a multi-dimensional view of various sensory inputs, which surpasses the capabilities of spreadsheets and database relational processing with three in more linear tools.

A value is presented by the multi-dimensional space correlation that is then used as a response to manufacturing, design, or life-cycle action in service. Machine learning is used to tie data to decisions made in the past, helping define the multi-dimensional space by taking inputs for examples that have less influence on the output, and then the algorithm used in the multi-dimensional space 44 can be adjusted over time as many data points 45A-C are created within the multi-dimensional space 44, providing for a lower influence on the outputted predicted inspection classification 54A.

Note that while the example of FIG. 5 is depicted and described with respect to 3 dimensions, the multi-dimensional space can generally be of any dimensionality, e.g., N-dimensions.

Example Interface for Entering Adopted Classifications

Figure 6:
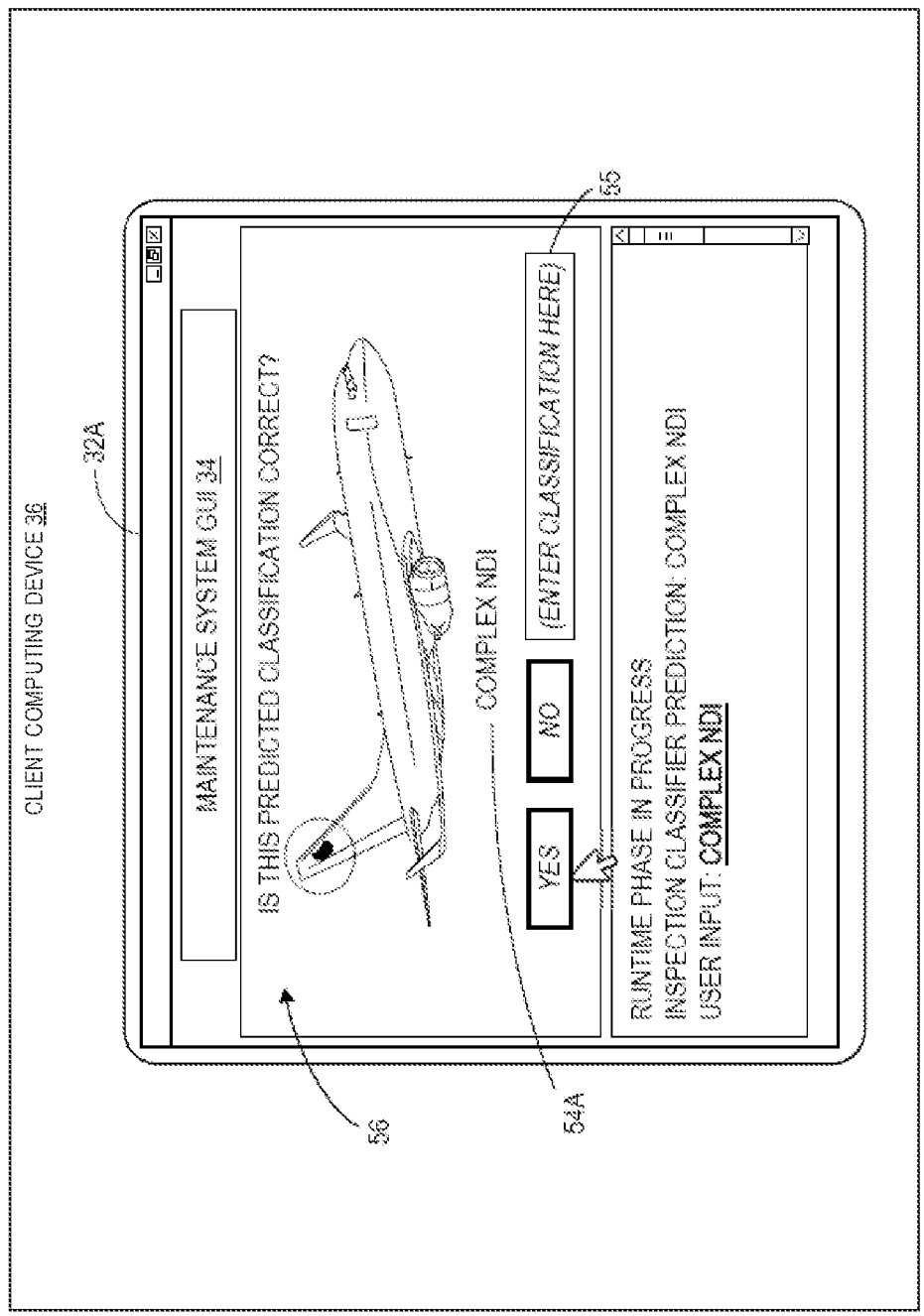
FIG. 6 depicts an exemplary graphical user interface of the inspection classifier according to the example embodiment of FIG. 4A of the subject disclosure.

Referring to FIG. 6, an exemplary maintenance system graphical user interface 34 is illustrated of the client computing device 36 executing the application client 32A according to the example of FIG. 1.

In this example, the inspection classifier has outputted a predicted inspection classification 54A of Complex NDI for event input data of an aircraft event with identifiable damage to the tail. The user prompt 56 for the user is shown on a graphical user interface (e.g., the graphical user interface 34 in FIG. 1) for the user to indicate whether or not to accept the predicted inspection classification 54A. If the user does not accept the predicted inspection classification 54A, a text box 55 is provided for the user to input a new inspection classification for the damage to the tail. In other embodiments, a multiple choice selector or a drop-down menu can alternatively be configured for the user to input a new alternative inspection classification, for example. The newly inputted inspection classification is then used for the feedback training of the inspection classifier. If the user accepts the predicted inspection classification 54A, then the predicted inspection classification is then used for the feedback training of the inspection classifier.

Examples of Processes and Methods for Determining Maintenance Actions

Figure 7:
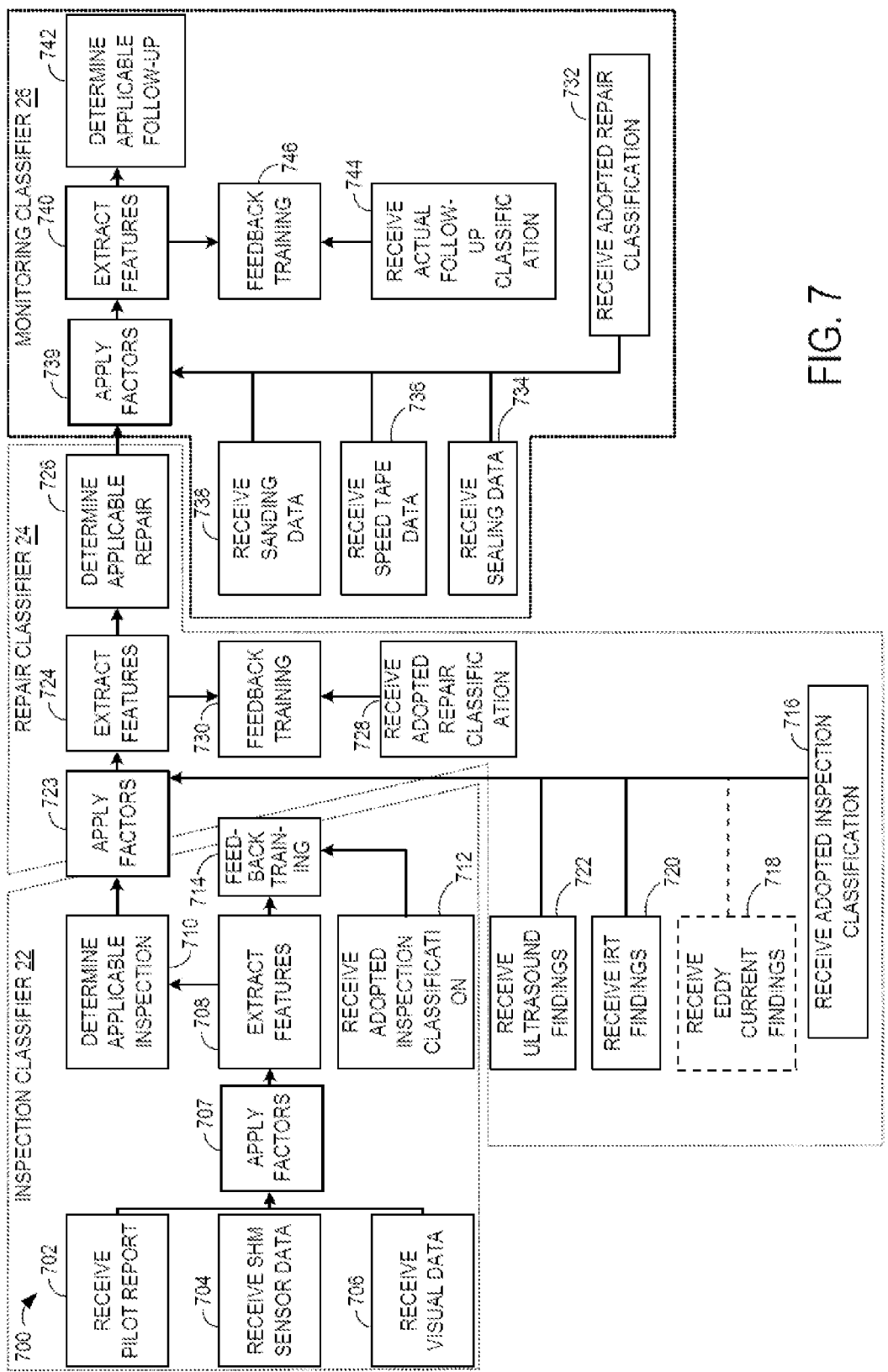
FIG. 7 depicts a process flow for the operation of the maintenance system of FIG. 1 at run-time with feedback training, according to one specific example of the subject disclosure.

Referring to FIG. 7, a flow chart is illustrated of a method 700 training the inspection classifier, the repair classifier, and the monitoring classifier according to one example. The following description of method 700 is provided with reference to the software and hardware components described above and shown in FIGS. 1-6 and 9. It will be appreciated that method 700 can be performed in other contexts using other suitable hardware and software components.

At step 702, the inspection classifier receives a pilot report as event input data. At step 704, the inspection classifier receives structural health monitoring sensor data from structural health monitoring sensors instrumented on aircraft as event input data. At step 706, the inspection classifier receives visual data of aircraft as event input data. At step 707, the event factors are applied to the event input data. At step 708, the inspection classifier extracts features of the adjusted event input data. At step 710, the inspection classifier determines a predicted inspection classification (applicable inspection) based upon the extracted features, and outputs the predicted inspection classification. At step 712, the inspection classifier receives user input of an adopted inspection classification for feedback training. At step 714, feedback training is performed for the inspection classifier using the event input data, the predicted inspection classification, and user input of an adopted inspection classification and the event factors are updated.

At step 716, the repair classifier receives user input of the adopted inspection classification. At step 718 (optional as shown), the repair classifier receives eddy current findings as inspection input data. Step 718 is optional because previous experience from similar events provides the eddy current findings are not useful for determining a predicted repair classification as later discussed in step 726. At step 720, the repair classifier receives infrared thermography (IRT) findings as inspection input data. At step 722, the repair classifier receives ultrasound findings as inspection input data. At step 723, the analysis factors are applied to the inspection input data. At step 724, the repair classifier extracts features of the adjusted inspection input data. At step 726, the repair classifier determines a predicted repair classification (applicable repair) based upon the extracted features, and outputs the predicted repair classification. At step 728, the repair classifier receives user input of an adopted repair classification for feedback training. At step 730, feedback training is performed for the repair classifier using the inspection input data, the predicted repair classification, and the user input of an adopted repair classification and the analysis factors are updated.

At step 732, the monitoring classifier receives the user input of the adopted repair classification. At step 734, the monitoring classifier receives sealing data as repair input data. At step 736, the monitoring classifier receives speed tape data as repair input data. At step 738, the monitoring classifier receives sanding data as repair input data. At step 739, the action factors are applied to the repair input data. At step 740, the monitoring classifier extracts features of the adjusted repair input data. At step 742, the monitoring classifier determines a predicted monitoring classification (applicable monitoring action) based upon the extracted features, and outputs the predicted monitoring classification. At step 744, the monitoring classifier receives user input of an adopted monitoring classification. At step 746, feedback training is performed for the monitoring classifier using the repair input data, the predicted monitoring classification, and the user input of the adopted monitoring classification and the action factors are updated.

In other embodiments, Step 707 occurs after Step 708 and before Step 710 such that the inspection classifier extracts features of the event input data, the event factors are applied to the extracted event input data features, and the inspection classifier determines a predicted inspection classification (applicable inspection) based upon the extracted features. The same order or operations may be applied to Steps 723, 724, and 726 and Steps 739, 740, and 742.

Figure 8:
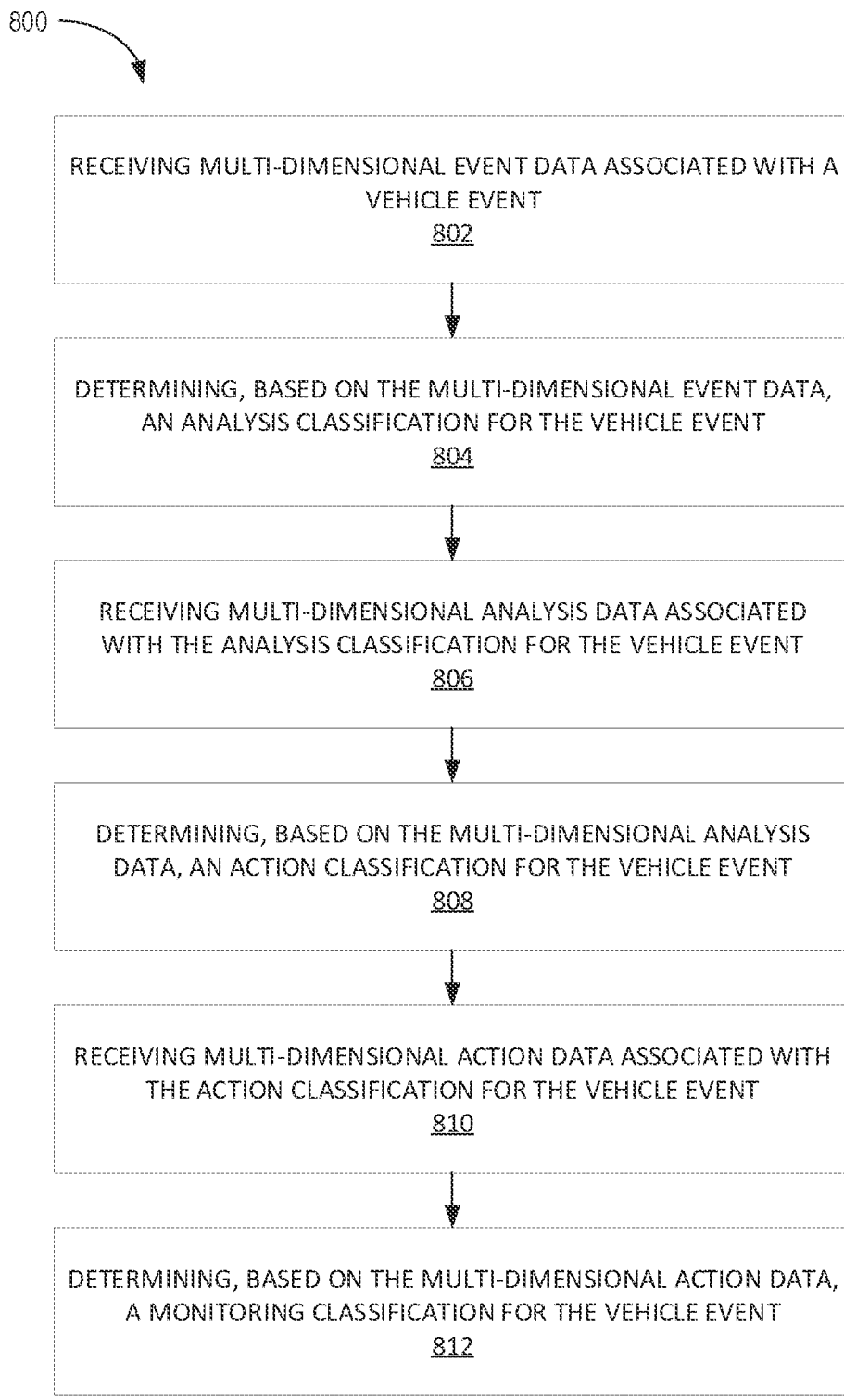
FIG. 8 depicts an example method for determining maintenance actions after a vehicle event.

FIG. 8 depicts an example method 800 for determining maintenance actions after a vehicle event.

Method 800 begins at step 802 with receiving multi-dimensional event data associated with a vehicle event, such as described above with respect to FIGS. 1-2 and 7.

Method 800 then proceeds to step 804 with determining an inspection classification for the vehicle event, such as described above with respect to FIGS. 1-2, 5, and 7. In some embodiments, the inspection classification is determined based on the multi-dimensional event data.

Method 800 then proceeds to step 806 with receiving multi-dimensional analysis data associated with the inspection classification for the vehicle event, such as described above with respect to FIGS. 1-2 and 7.

Method 800 then proceeds to step 808 with determining a repair classification for the vehicle event, such as described above with respect to FIGS. 1-2 and 7. In some embodiments, the repair classification is determined based on the multi-dimensional analysis data.

Method 800 then proceeds to step 810 with receiving multi-dimensional action data associated with the repair classification for the vehicle event, such as described above with respect to FIGS. 1-2 and 7.

Method 800 then proceeds to step 812 with determining a monitoring classification for the vehicle event, such as described above with respect to FIGS. 1-2 and 7. In some embodiments, the monitoring classification is determined based on the multi-dimensional action data.

In some embodiments of method 800, the determining, based on the multi-dimensional event data, the inspection classification for the vehicle event, comprises applying a learnable event model to the multi-dimensional event data, the learnable event model comprises a set of learnable event factors, and each learnable event factor of the set of learnable event factors is associated with a dimension of the multi-dimensional event data. For example, as described above with respect to FIG. 2, the inspection classifier 22 applies the learnable event factors 22$g$-$i$ to the multi-dimensional event input data 28A-C such that each event factor corresponds to a dimension of the multi-dimensional event input data. The inspection classifier 22 and the learnable event factors 22$g$-$i$ are learnable such that they can be adjusted based on training and feedback data as described above with respect to FIGS. 3A and 5. Some embodiments further comprise modifying the set of learnable event factors based on inspection classification feedback data. For example, the learnable event factors 22$g$-$i$ are adjusted based on the inspection training data feedback pair 31A, which includes the adopted inspection classification 30A, as described above with respect to FIG. 3A.

In some embodiments, the determining, based on the multi-dimensional analysis data, the repair classification for the vehicle event, comprises applying a learnable analysis model to the multi-dimensional analysis data, the learnable analysis model comprises a set of learnable analysis factors, and each learnable analysis factor of the set of learnable analysis factors is associated with a dimension of the multi-dimensional analysis data. For example, as described above with respect to FIG. 2, the repair classifier 24 applies the learnable analysis factors 24$g$-$i$ to the multi-dimensional inspection input data 48A-C such that each analysis factor corresponds to a dimension of the multi-dimensional inspection input data. The repair classifier 24 and the learnable analysis factors 24$g$-$i$ are learnable such that they can be adjusted based on training and feedback data as described above with respect to FIG. 3B. Some embodiments further comprise modifying the set of learnable analysis factors based on repair classification feedback data. For example, the learnable analysis factors 24$g$-$i$ are adjusted based on the repair training data feedback pair 31B, which includes the adopted repair classification 30B, as described above with respect to FIG. 3B.

In some embodiments, the multi-dimensional analysis data comprises at least one dimension associated with an output of the learnable event model. For example, the adopted inspection classification 30A is included in at least one dimension of the multi-dimensional analysis data 48 as described above with respect to FIG. 2.

In some embodiments, the determining, based on the multi-dimensional action data, the monitoring classification comprises applying a learnable action model to the multi-dimensional action data, the learnable action model comprises a set of learnable action factors, and each learnable action factor of the set of learnable action factors is associated with a dimension of the multi-dimensional action data. For example, as described above with respect to FIG. 2, the monitoring classifier 26 applies the learnable action factors 26$g$-$i$ to the multi-dimensional repair input data 58A-C such that each action factor corresponds to a dimension of the multi-dimensional repair input data. The monitoring classifier 26 and the learnable action factors 26$g$-$i$ are learnable such that they can be adjusted based on training and feedback data as described above with respect to FIG. 3C. Some embodiments further comprise modifying the set of learnable action factors based on monitoring classification feedback data. For example, the learnable action factors 26$g$-$i$ are adjusted based on the monitoring training data feedback pair 31C, which includes the adopted monitoring classification 30C, as described above with respect to FIG. 3C.

In some embodiments, the multi-dimensional action data comprises at least one dimension associated with an output of the learnable analysis model. For example, the adopted repair classification 30B is included in at least one dimension of the multi-dimensional action data 58 as described above with respect to FIG. 2.

In some embodiments of method 800, the vehicle event is associated with an aircraft as described above with respect to FIGS. 1 and 2.

In some embodiments of method 800, the inspection classification comprises a type of vehicle inspection to perform on a vehicle associated with the vehicle event, such as described above with respect to FIGS. 1-2 and 7.

In some embodiments, the type of vehicle inspection comprises a non-destructive inspection, such as described above with respect to FIGS. 1 and 2.

In some embodiments, the type of vehicle inspection comprises at least one of: an infrared thermography inspection; an ultrasonic inspection; an eddy current inspection; a liquid penetrant inspection; a magnetic particle inspection; a radiography inspection; a vibration inspection; or a laser-based inspection, such as described above with respect to FIG. 4B.

In some embodiments of method 800, the multi-dimensional event data comprises at least one of: event dimensions; event location; event time; event environmental information; event material information; event historical data; or event vehicle data, such as described above with respect to FIG. 2.

In some embodiments of method 800, the vehicle event comprises at least one of: a lightning strike event; a hail event; a hard impact event; an overheating event; an environmental event; an animal strike event; a foreign object intrusion event; or a beyond design limit event, such as described above with respect to FIG. 1.

In some embodiments of method 800, the repair classification comprises a type of vehicle action to perform on a vehicle associated with the vehicle event. In some embodiments, the type of vehicle action comprises a maintenance or repair action. In some embodiments, the type of vehicle action comprises a repair, such as described above with respect to FIG. 2. In some embodiments, the type of vehicle action comprises at least one of: removing material; cleaning; electroplating; applying a sealant; applying a chemical conversion coating; applying a paint; applying a thermal spray coating; applying speed tape; welding; or monitoring, such as described above with respect to FIGS. 1 and 4B.

In some embodiments of method 800, the monitoring classification for the vehicle event comprises a type of information about a maintenance or repair action performed on a vehicle associated with the vehicle event, such as described above with respect to FIG. 2. In some embodiments, the type of information comprises at least one of: a predicted lifecycle of the repair; a monitoring schedule for the repair; or a monitoring repair action, such as described above with respect to FIGS. 4A and 4B.

In some embodiments of method 800, the monitoring classification for the vehicle event comprises an action to perform with respect to a vehicle associated with the vehicle event, such as described above with respect to FIG. 2.

Figure 9A:
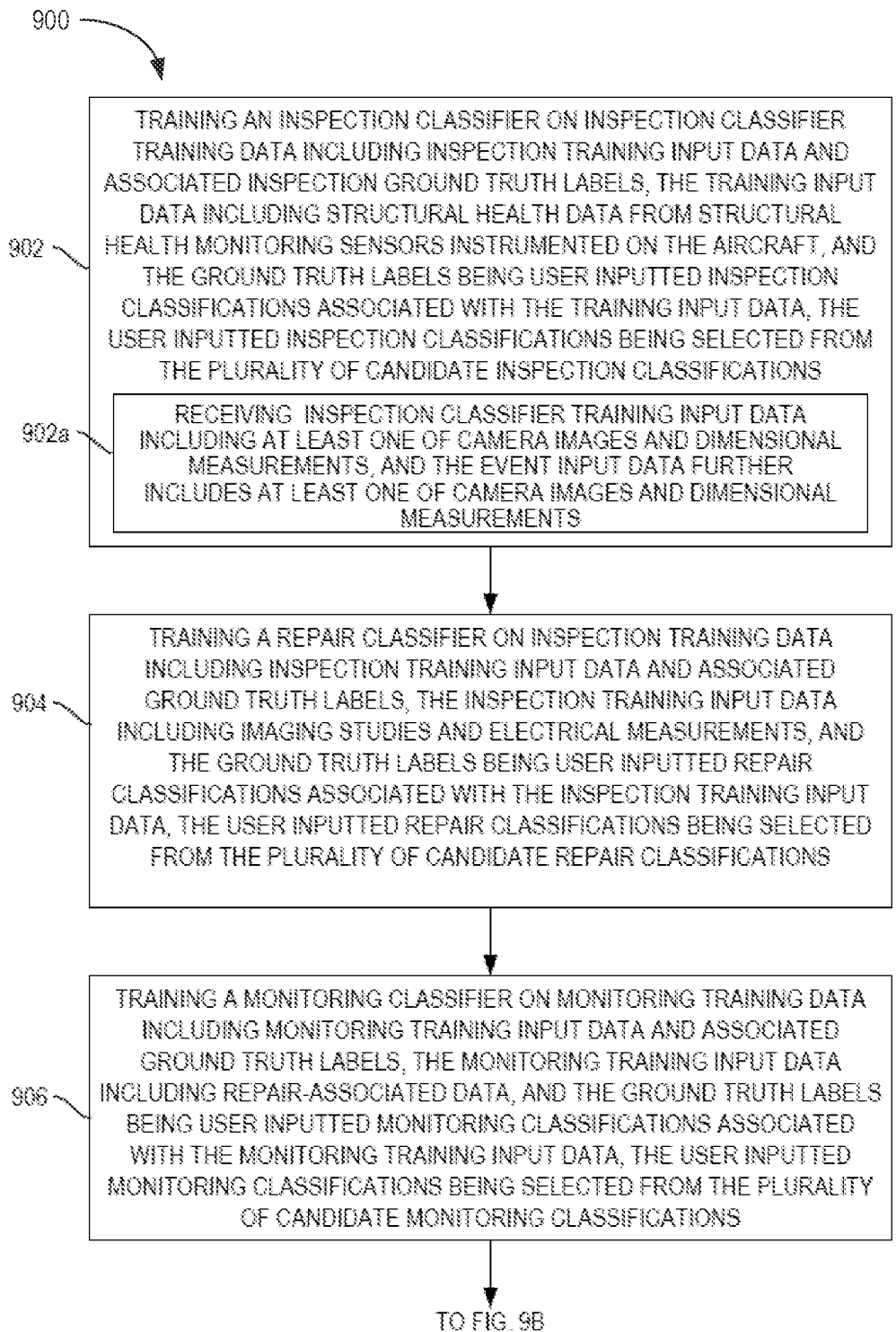
FIG. 9A depicts a flow diagram of a training phase of a maintenance computing method for use in connection with aircraft maintenance, according to an example of the subject disclosure.

Referring to FIGS. 9A-9D, a flow chart is illustrated of a maintenance computing method 900 for use in maintenance of a vehicle (e.g., an aircraft). In FIG. 9A, process steps of method related to training the inspection classifier, the repair classifier, and the monitoring classifier are shown. The following description of method 900 is provided with reference to the software and hardware components described above and shown in FIGS. 1-6 and 9. It will be appreciated that method 900 can be performed in other contexts using other suitable hardware and software components.

At step 902, an inspection classifier is trained on inspection classifier training data including inspection training input data and associated inspection ground truth labels, the training input data including structural health data from structural health monitoring sensors instrumented on the aircraft, and the ground truth labels being adopted inspection classifications associated with the training input data, the adopted inspection classifications being selected from the plurality of candidate inspection classifications. At step 902a, which can be included in step 902, inspection classifier training input data is received including at least one of camera images, audio data, or dimensional measurements, and the event input data further includes at least one of camera images, audio data, or dimensional measurements.

At step 904, a repair classifier is trained on inspection training data including inspection training input data and associated ground truth labels, the inspection training input data including imaging studies and electrical measurements, and the ground truth labels being adopted repair classifications associated with the inspection training input data, the adopted repair classifications being selected from the plurality of candidate repair classifications. At step 906, a monitoring classifier is trained on monitoring training data including monitoring training input data and associated ground truth labels, the monitoring training input data including repair data, and the ground truth labels being adopted monitoring classifications associated with the monitoring training input data, the adopted monitoring classifications being selected from the plurality of candidate monitoring classifications.

Figure 9B:
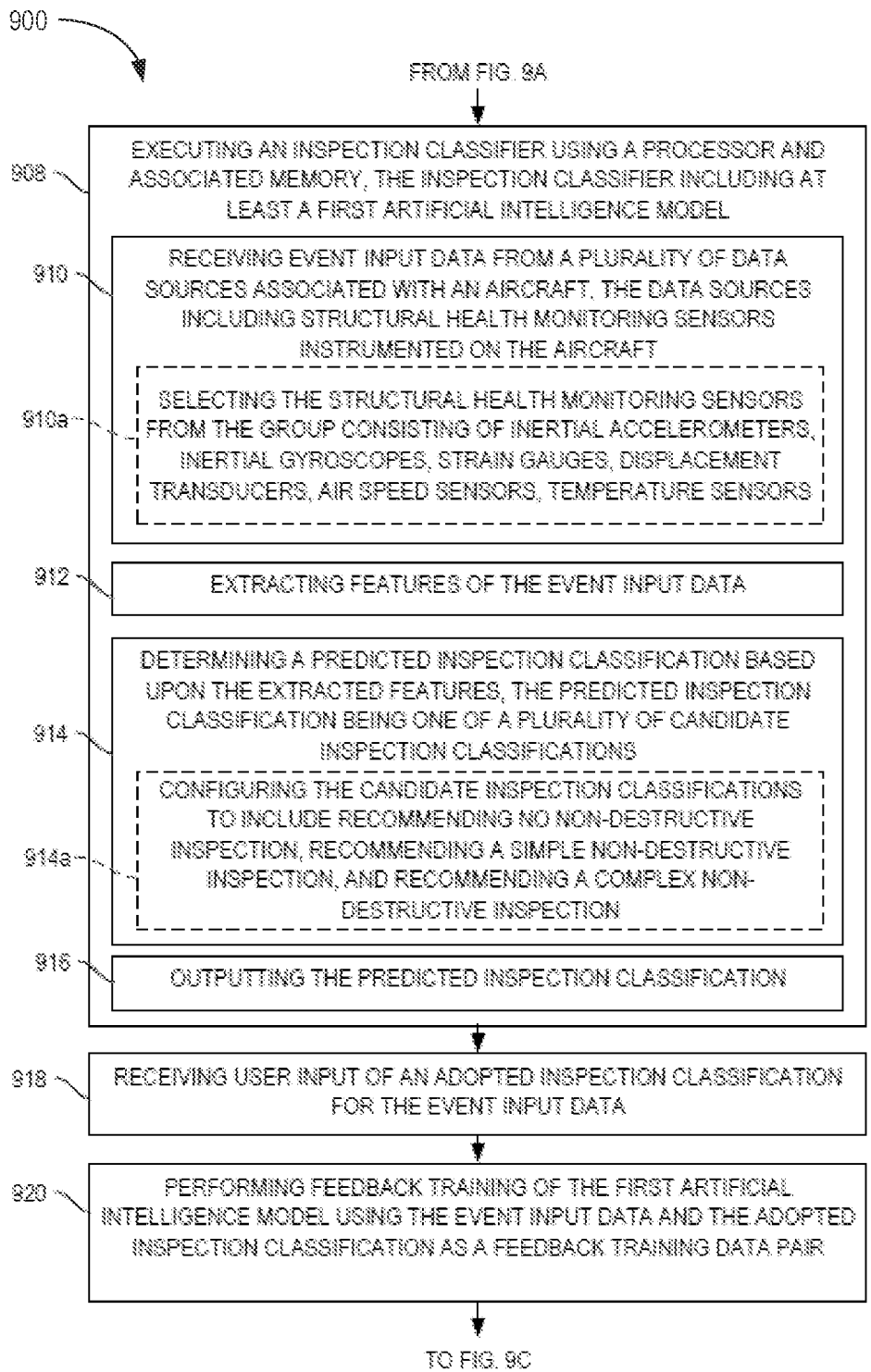
FIG. 9B is a continuation of the flow diagram of FIG. 9A, showing a run-time phase of the method, illustrating process steps involved in using an inspection classifier including feedback training.

Referring to FIG. 9B, a flow chart is illustrated that is a continuation of the method 900 of FIG. 9A, and which illustrates executing and performing feedback training of an inspection classifier. At step 908, the inspection classifier is executed using a processor and associated memory, the inspection classifier including at least a first machine learning model. Step 908 includes step 910 of receiving event input data from a plurality of data sources associated with an aircraft, the data sources including structural health monitoring sensors instrumented on the aircraft, step 912 of extracting features of the event input data, step 914 of determining a predicted inspection classification based upon the extracted features, the predicted inspection classification being one of a plurality of candidate inspection classifications, and step 916 of outputting the predicted inspection classification. Step 910 can include a step 910a of selecting the structural health monitoring sensors from the group consisting of inertial accelerometers, inertial gyroscopes, strain gauges, displacement transducers, air speed sensors, temperature sensors. Step 914 can include a step 914a of configuring the candidate inspection classifications to include recommending no non-destructive inspection, recommending a simple non-destructive inspection, and recommending a complex non-destructive inspection.

Following step 908 of executing the inspection classifier, at step 918, user input is received of an adopted inspection classification for the event input data. At step 920, feedback training is performed of the first machine learning model using the event input data and the adopted inspection classification as a feedback training data pair. Feedback training includes adjusting the categorization of events in the event multi-dimensional space of the first machine learning model. Feedback training also includes adjusting the learnable event factors.

Figure 9C:
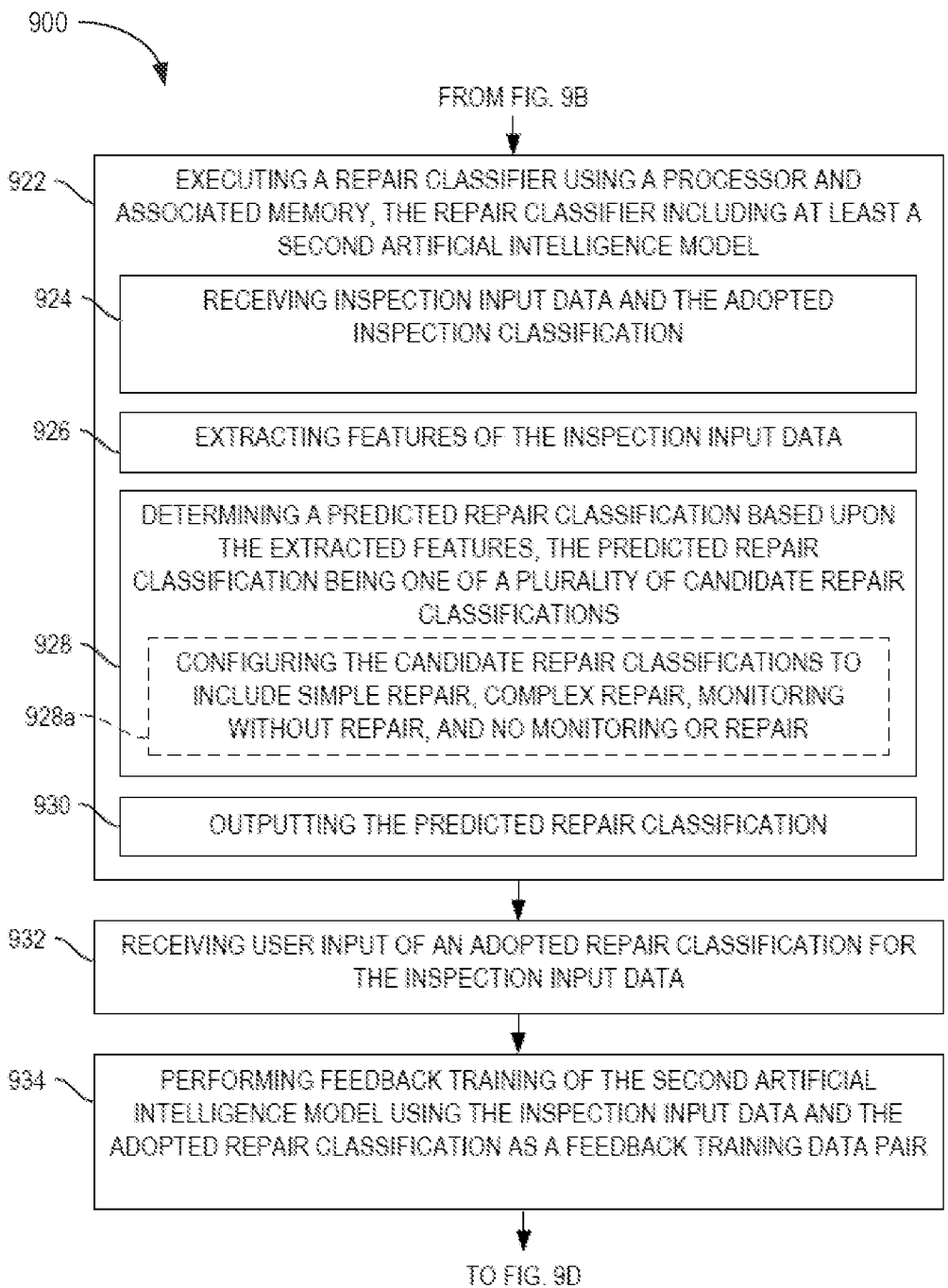
FIG. 9C is a continuation of the flow diagram of FIG. 9B, showing a run-time phase of the method, illustrating process steps involved in using a repair classifier including feedback training.

Referring to FIG. 9C, a flow chart is illustrated that is a continuation of the method 400 of FIG. 8B, and which illustrates executing and performing feedback training of a repair classifier. At step 922, the repair classifier is executed using a processor and associated memory, the repair classifier including at least a second machine learning model. Step 922 includes step 924 of receiving inspection input data including inspection inputs and the adopted inspection classification, step 926 of extracting features of the inspection input data, step 928 of determining a predicted repair classification based upon the extracted features, the predicted repair classification being one of a plurality of candidate repair classifications, and step 930 of outputting the predicted repair classification. Step 928 can include a step 928a of configuring the candidate repair classifications to include simple repair, complex repair, monitoring without repair, and no monitoring or repair.

Following step 922 of executing the repair classifier, at step 932, a user input is received of an adopted repair classification for the inspection input data. At step 934, feedback training is performed of the second machine learning model using the inspection input data and the adopted repair classification as a feedback training data pair. Feedback training includes adjusting a categorization of inspections in an inspection multi-dimensional space of the second machine learning model. Feedback training also includes adjusting the learnable analysis factors.

Figure 9D:
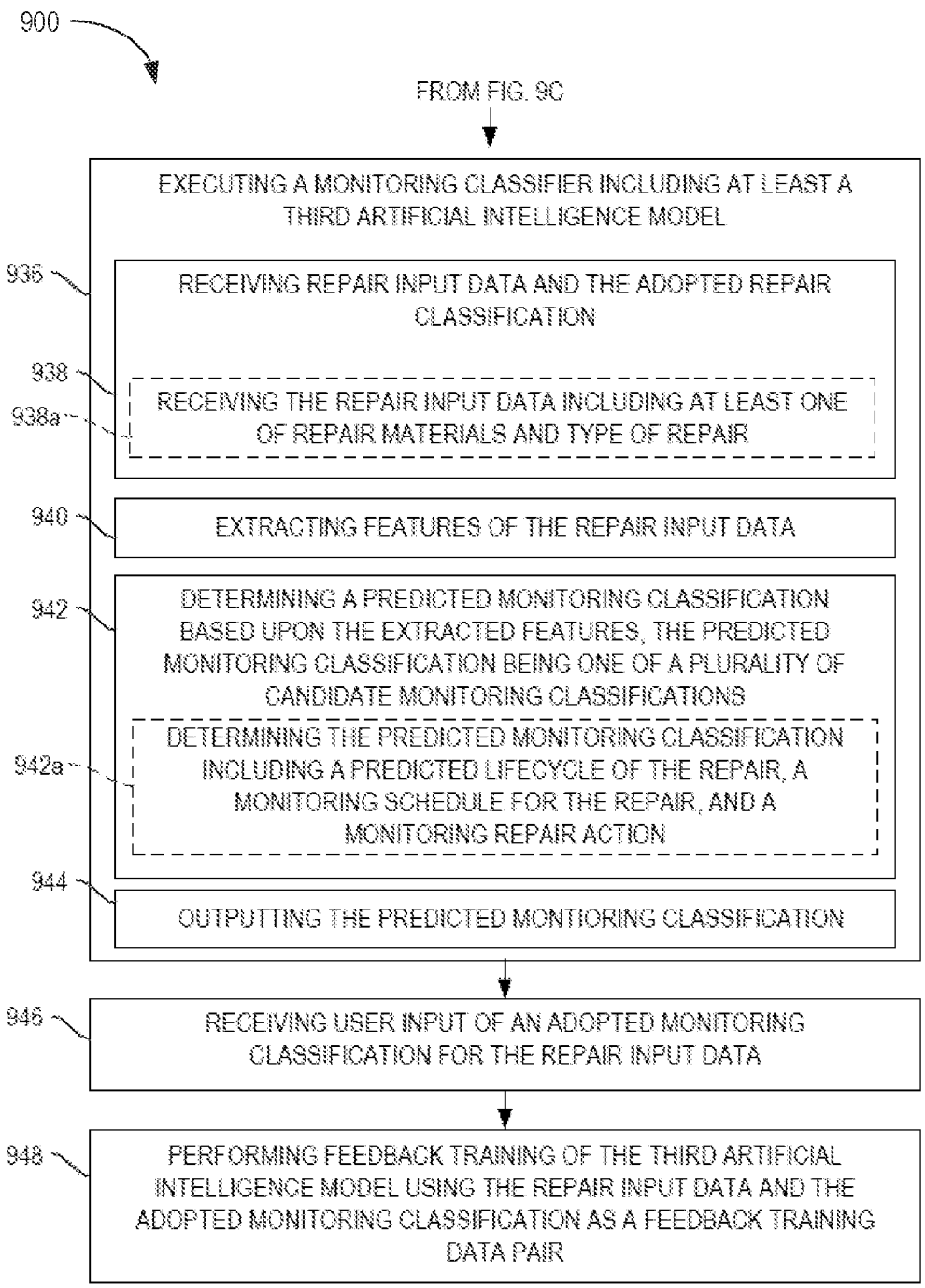
FIG. 9D is a continuation of the flow diagram of FIG. 9C, showing a run-time phase of the method, illustrating process steps involved in using a monitoring classifier including feedback training.

Referring to FIG. 9D, a flow chart is illustrated that is a continuation of the method 400 of FIG. 9C, and which illustrates executing and feedback training of a monitoring classifier. At step 936, the monitoring classifier is executed using a processor and associated memory, the monitoring classifier including at least a third machine learning model.

Step 936 includes step 938 of receiving run-time repair input data including repair input data and the adopted repair classification, step 940 of extracting features of the repair input data, step 942 of determining a predicted monitoring classification based upon the extracted features, the predicted monitoring classification being one of a plurality of candidate monitoring classifications, and step 944 of outputting the predicted monitoring classification. Step 938 can include step 938a of receiving the repair input data including at least one of repair materials or type of repair. Step 942 can include step 942a of determining the predicted monitoring classification including a predicted lifecycle of the repair, a monitoring schedule for the repair, and a monitoring repair action.

Following step 936 of executing the monitoring classifier, at step 946, a user input is received of an adopted monitoring classification for the repair input data. At step 948, feedback training is performed of the third machine learning model using the repair input data and the adopted monitoring classification as a feedback training data pair. Feedback training includes adjusting a categorization of repairs in a repair multi-dimensional space of the third machine learning model. Feedback training also includes adjusting the learnable action factors.

The systems and methods described above with respect to FIGS. 1-9D offer the technical advantage of enabling machine learning techniques to both predict inspection classifications, repair classifications and monitoring classifications associated with maintenance of aircraft componentry to aid human technicians in their inspections, repairs, and monitoring or follow-up actions, while at the same time affording the technicians control over the decisions made at each stage in the maintenance process. The systems and methods are configured to learn and improve the accuracy of their predictions over time as each machine learning model is trained based on real world feedback from technicians. With such a system, an efficient and high-quality inspection, repair, and monitoring regime can be reliably maintained.

Example Processing System

Figure 10:
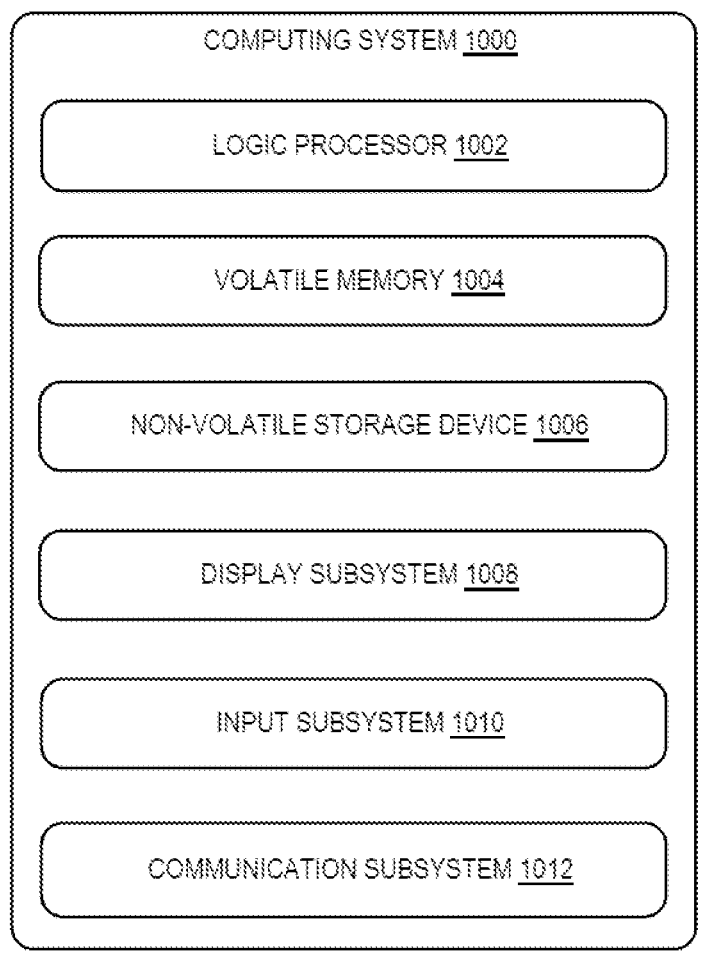
FIG. 10 depicts a schematic view of an example computing environment that can be used according to the systems and methods described herein.

FIG. 10 schematically shows a non-limiting embodiment of a computing system 1000 that can enact one or more of the processes described above. In certain embodiments, the computing system 1000 is a processing system. Computing system 1000 is shown in simplified form. Computing system 1000 can embody the maintenance computing device 11 or client computing device 36 described above and illustrated in FIGS. 1 and 2. Computing system 1000 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic processor 1002 volatile memory 1004, and a non-volatile storage device 1006. Computing system 1000 can optionally include a display subsystem 1008, input subsystem 1010, communication subsystem 1012, and/or other components not shown in FIG. 10. Logic processor 1002 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 1002 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 can be transformed—e.g., to hold different data.

Non-volatile storage device 1006 can include physical devices that are removable and/or built in. Non-volatile storage device 1006 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 can include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 can include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SOC, and complex programmable logic devices (CPLDs), for example.

The terms "module," "program," and "engine" can be used to describe an aspect of computing system typically implemented in software by a processor to perform a particular function using portions of volatile memory, which function involves transformative processing that specially configures the processor to perform the function. Thus, a module, program, or engine can be instantiated via logic processor 1002 executing instructions held by non-volatile storage device 1006, using portions of volatile memory 1004. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 1008 can be used to present a visual representation of data held by non-volatile storage device 1006. The visual representation can take the form of a graphical user interface (GUI). As the herein described methods and processes change the data held by the non-volatile storage device, and thus transform the state of the non-volatile storage device, the state of display subsystem 1008 can likewise be transformed to visually represent changes in the underlying data. Display subsystem 1008 can include one or more display devices utilizing virtually any type of technology.

Such display devices can be combined with logic processor 1002, volatile memory 1004, and/or non-volatile storage device 1006 in a shared enclosure, or such display devices can be peripheral display devices.

When included, input subsystem 1010 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 can be configured to communicatively couple various computing devices described herein with each other, and with other devices. Communication subsystem 1012 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some embodiments, the communication subsystem can allow computing system 1000 to send and/or receive messages to and/or from other devices via a network such as the Internet.

Example Clauses

Implementation examples are described in the following numbered clauses:

Clause 1: A method, comprising: receiving multi-dimensional event data associated with a vehicle event; determining, based on the multi-dimensional event data, an inspection classification for the vehicle event; receiving multi-dimensional analysis data associated with the inspection classification for the vehicle event; determining, based on the multi-dimensional analysis data, a repair classification for the vehicle event; receiving multi-dimensional action data associated with the repair classification for the vehicle event; and determining, based on the multi-dimensional action data, a monitoring classification for the vehicle event.

Clause 2: The method of Clause 1, wherein: determining, based on the multi-dimensional event data, the inspection classification for the vehicle event, comprises applying a learnable event model to the multi-dimensional event data, the learnable event model comprises a set of learnable event factors, and each learnable event factor of the set of learnable event factors is associated with a dimension of the multi-dimensional event data.

Clause 3. The method of Clause 2, further comprising modifying the set of learnable event factors based on inspection classification feedback data.

Clause 4. The method of Clause 2, wherein: determining, based on the multi-dimensional analysis data, the repair classification for the vehicle event, comprises applying a learnable analysis model to the multi-dimensional analysis data, the learnable analysis model comprises a set of learnable analysis factors, and each learnable analysis factor of the set of learnable analysis factors is associated with a dimension of the multi-dimensional analysis data.

Clause 5. The method of Clause 4, further comprising modifying the set of learnable analysis factors based on repair classification feedback data.

Clause 6. The method of Clause 4, wherein the multi-dimensional analysis data comprises at least one dimension associated with an output of the learnable event model.

Clause 7. The method of Clause 4, wherein: determining, based on the multi-dimensional action data, the monitoring classification comprises applying a learnable action model to the multi-dimensional action data, the learnable action model comprises a set of learnable action factors, and each learnable action factor of the set of learnable action factors is associated with a dimension of the multi-dimensional action data.

Clause 8. The method of Clause 7, further comprising modifying the set of learnable action factors based on monitoring classification feedback data.

Clause 9. The method of Clause 7, wherein the multi-dimensional action data comprises at least one dimension associated with an output of the learnable analysis model.

Clause 10. The method of Clauses 1-9, wherein the vehicle event is associated with an aircraft.

Clause 11. The method of Clauses 1-10, wherein the inspection classification comprises a type of vehicle inspection to perform on a vehicle associated with the vehicle event.

Clause 12. The method of Clause 11, wherein the type of vehicle inspection comprises a non-destructive inspection.

Clause 13. The method of Clause 11, wherein the type of vehicle inspection comprises at least one of: an infrared thermography inspection; an ultrasonic inspection; an eddy current inspection; a liquid penetrant inspection; a magnetic particle inspection; a radiography inspection; a vibration inspection; or a laser-based inspection.

Clause 14. The method of Clauses 1-13, wherein the multi-dimensional event data comprises at least one of: event dimensions; event location; event time; event environmental information; event material information; event historical data; or event vehicle data.

Clause 15. The method of Clauses 1-14, wherein the vehicle event comprises at least one of: a lightning strike event; a hail event; a hard impact event; an overheating event; an environmental event; an animal strike event; a foreign object intrusion event; or a beyond design limit event.

Clause 16. The method of Clauses 1-15, wherein the repair classification comprises a type of vehicle action to perform on a vehicle associated with the vehicle event.

Clause 17. The method of Clause 16, wherein the type of vehicle action comprises a maintenance or repair action.

Clause 18. The method of Clause 16, wherein the type of vehicle action comprises a repair.

Clause 19. The method of Clause 16, wherein the type of vehicle action comprises at least one of: removing material; cleaning; electroplating; applying a sealant; applying a chemical conversion coating; applying a paint; applying a thermal spray coating; applying speed tape; welding; or monitoring.

Clause 20. The method of Clauses 1-19, wherein the monitoring classification for the vehicle event comprises a type of information about a maintenance action or a repair action performed on a vehicle associated with the vehicle event.

Clause 21. The method of Clause 20, wherein the type of information comprises at least one of: a predicted lifecycle of the repair; a monitoring schedule for the repair; or a monitoring repair action.

Clause 22. The method of Clauses 1-21, wherein the monitoring classification for the vehicle event comprises an action to perform with respect to a vehicle associated with the vehicle event.

Clause 23. A processing system, comprising: a memory comprising computer-executable instructions; and one or more processors configured to execute the computer-executable instructions and cause the processing system to perform a method in accordance with any one of Clauses 1-22.

Clause 24. A processing system, comprising means for performing a method in accordance with any one of Clauses 1-22.

Clause 25. A non-transitory computer-readable medium comprising computer-executable instructions that, when executed by one or more processors of a processing system, cause the processing system to perform a method in accordance with any one of Clauses 1-22.

Clause 26. A computer program product embodied on a computer-readable storage medium comprising code for performing a method in accordance with any one of Clauses 1-22.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing machine learning, comprising:
  receiving multi-dimensional event data associated with an aircraft event;

training a first machine learning model based on a set of factors, wherein each factor in the set of factors is associated with a dimension of the multi-dimensional event data;

determining, based on applying the first machine learning model to the multi-dimensional event data, an inspection classification in response to the aircraft event;

receiving multi-dimensional analysis data associated with the inspection classification in response to the aircraft event;

determining, based on applying a second machine learning model to the multi-dimensional analysis data, a repair classification in response to the aircraft event;

receiving multi-dimensional action data associated with the repair classification in response to the aircraft event;

determining, based on applying a third machine learning model to the multi-dimensional action data, a monitoring classification in response to the aircraft event;

receiving feedback data associated with the inspection classification;

modifying the set of factors based on the feedback data; and retraining the first machine learning model based on the modified set of factors.

2. The method of Claim 1, wherein:
the second machine learning model comprises a set of learnable analysis factors, and
each learnable analysis factor of the set of learnable analysis factors is associated with a dimension of the multi-dimensional analysis data.

3. The method of claim 2, further comprising modifying the set of learnable analysis factors based on repair classification feedback data.

4. The method of claim 2, wherein the multi-dimensional analysis data comprises at least one dimension associated with an output of the first machine learning model.

5. The method of claim 2, wherein:
the third machine learning model comprises a set of learnable action factors, and
each learnable action factor of the set of learnable action factors is associated with a dimension of the multi-dimensional action data.

6. The method of claim 5, further comprising modifying the set of learnable action factors based on monitoring classification feedback data.

7. The method of claim 5, wherein the multi-dimensional action data comprises at least one dimension associated with an output of the second machine learning model.

8. The method of claim 1, wherein the inspection classification comprises a type of aircraft inspection intended to perform on an aircraft associated with the aircraft event.

9. The method of claim 8, wherein the type of aircraft inspection comprises a non-destructive inspection.

10. The method of claim 1, wherein the repair classification comprises a type of aircraft action intended to perform on an aircraft associated with the aircraft event.

11. The method of claim 10, wherein the type of aircraft action comprises a maintenance or repair action.

12. The method of claim 10, wherein the type of aircraft action comprises a repair.

13. The method of claim 1, wherein the monitoring classification in response to the aircraft event comprises a type of information about a maintenance action or a repair action performed on an aircraft associated with the aircraft event.

14. The method of claim 1, wherein the monitoring classification in response to the aircraft event comprises an action intended to perform with respect to an aircraft associated with the aircraft event.

15. A processing system, comprising:
a memory comprising computer-executable instructions; and
one or more processors configured to execute the computer-executable instructions and cause the processing system to:
receive multi-dimensional event data associated with an aircraft event;
train a first machine learning model based on a set of factors, wherein each factor in the set of factors is associated with a dimension of the multi-dimensional event data;
determine, based on applying the first machine learning model to the multi-dimensional event data, an inspection classification in response to the aircraft event;
receive multi-dimensional analysis data associated with the inspection classification in response to the aircraft event;
determine, based on applying a second machine learning model to the multi-dimensional analysis data, a repair classification in response to the aircraft event;
receive multi-dimensional action data associated with the repair classification in response to the aircraft event;
determine, based on applying a third machine learning model to the multi-dimensional action data, a monitoring classification in response to the aircraft event;
receive feedback data associated with the inspection classification;
modify the set of factors based on the feedback data; and
retrain the first machine learning model based on the modified set of factors.

16. The processing system of claim 15, wherein:
the determining, based on the multi-dimensional analysis data, the repair classification in response to the aircraft event is performed by applying a second machine learning model to the multi-dimensional analysis data,
the second machine learning model comprises a set of learnable analysis factors,
each learnable analysis factor of the set of learnable analysis factors is associated with a dimension of the multi-dimensional analysis data,
the determining, based on the multi-dimensional action data, the monitoring classification is performed by applying a third machine learning model to the multi-dimensional action data,
the third machine learning model comprises a set of learnable action factors, and
each learnable action factor of the set of learnable action factors is associated with a dimension of the multi-dimensional action data.

17. The processing system of claim 16, wherein:
the inspection classification comprises a type of aircraft inspection intended to perform on an aircraft associated with the aircraft event;
the type of aircraft inspection comprises at least one of:
an infrared thermography inspection;
an ultrasonic inspection;
an eddy current inspection;
a liquid penetrant inspection;
a magnetic particle inspection;
a radiography inspection;
a vibration inspection;
or a laser-based inspection;

the multi-dimensional event data comprises at least one of:
  event dimensions;
  event location;
  event time;
  event environmental information;
  event material information;
  event historical data; or
  event aircraft data;
the aircraft event is associated with an aircraft and comprises at least one of:
  a lightning strike event;
  a hail event;
  a hard impact event;
  an overheating event;
  an environmental event;
  an animal strike event;
  a foreign object intrusion event; or
  a beyond design limit event;
the repair classification comprises a type of aircraft action intended to perform on an aircraft associated with the aircraft event;
the type of aircraft action comprises at least one of:
  removing material;
  cleaning;
  electroplating;
  applying a sealant;
  applying a chemical conversion coating;
  applying a paint;
  applying a thermal spray coating;
  applying speed tape;
  welding; or
  monitoring;
the monitoring classification in response to the aircraft event comprises a type of information about a maintenance action or a repair action performed on an aircraft associated with the aircraft event; and
the type of information comprises at least one of:
  a predicted lifecycle of the maintenance action or a repair action;
  a monitoring schedule for the maintenance action or a repair action; or
  a monitoring maintenance action or a repair action.

18. A non-transitory computer-readable medium comprising computer-executable instructions that, when executed by one or more processors of a processing system, cause the processing system to perform a method, the method comprising:
  training a first machine learning model based on a set of factors, wherein each factor in the set of factors is associated with a dimension of the multi-dimensional event data;
  determining, based on applying the first machine learning model to the multi-dimensional event data, an inspection classification in response to the aircraft event;
  receiving multi-dimensional analysis data associated with the inspection classification in response to the aircraft event;
  determining, based on applying a second machine learning model to the multi-dimensional analysis data, a repair classification in response to the aircraft event;
  receiving multi-dimensional action data associated with the repair classification in response to the aircraft event;
  determining, based on applying a third machine learning model to the multi-dimensional action data, a monitoring classification in response to the aircraft event;
  receiving feedback data associated with the inspection classification;
  modifying the set of factors based on the feedback data; and
  retraining the first machine learning model based on the modified set of factors.

19. The processing system of claim 16, wherein the multi-dimensional analysis data comprises at least one dimension associated with an output of the first machine learning model.

20. The processing system of claim 16, further comprising modifying the set of learnable action factors based on monitoring classification feedback data.

* * * * *